United States Patent
Fortescu et al.

(10) Patent No.: US 8,260,315 B2
(45) Date of Patent: *Sep. 4, 2012

(54) DETERMINING MOBILE CONTENT FOR A SOCIAL NETWORK BASED ON LOCATION AND TIME

(75) Inventors: Murray Blake Fortescu, London (GB); Paul Robert Birnie, London (GB)

(73) Assignee: Yahoo! Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/042,251

(22) Filed: Mar. 7, 2011

(65) Prior Publication Data

US 2011/0159890 A1 Jun. 30, 2011

Related U.S. Application Data

(63) Continuation of application No. 11/555,675, filed on Nov. 1, 2006, now Pat. No. 7,917,154.

(51) Int. Cl.
*H04W 24/00* (2009.01)
(52) U.S. Cl. ............ 455/456.1; 701/468; 701/469; 707/999.005
(58) Field of Classification Search .......... 455/456.1
See application file for complete search history.

(56) References Cited

U.S. PATENT DOCUMENTS

| 5,493,692 | A | 2/1996 | Theimer et al. |
| 5,611,050 | A | 3/1997 | Theimer |
| 5,835,087 | A | 11/1998 | Herz et al. |
| 5,950,193 | A | 9/1999 | Kulkarni |
| 5,996,006 | A | 11/1999 | Speicher |
| 6,029,141 | A | 2/2000 | Bezos et al. |
| 6,112,181 | A | 8/2000 | Shear et al. |
| 6,175,831 | B1 | 1/2001 | Weinreich et al. |
| 6,269,369 | B1 | 7/2001 | Robertson |
| 6,317,718 | B1 | 11/2001 | Fano |

(Continued)

FOREIGN PATENT DOCUMENTS

EP 1176840 A1 1/2002

(Continued)

OTHER PUBLICATIONS

International Search Report and Written Opinion of the International Searching Authority dated Dec. 14, 2007 for PCT/US2007/070520.

(Continued)

*Primary Examiner* — Anthony Addy
*Assistant Examiner* — Joseph Dean, Jr.
(74) *Attorney, Agent, or Firm* — Frommer Lawrence & Haug LLP; John W. Branch

(57) ABSTRACT

A device, system, and method are directed towards updating location information for a social network. A request for the location information associated with a GPS coordinate is received from a client device associated with a member of the social network. In response to the request, a location name associated with another member of the social network is provided to the client device based on the GPS coordinate. Another location name may be received from the client device. The other location name may be associated with the GPS coordinate and with the member in the social network. Thus, the GPS coordinate and/or member may be associated with a plurality of location names. A location description may also be received and associated with the location name and with the member in the social network.

20 Claims, 16 Drawing Sheets

U.S. PATENT DOCUMENTS

| | | |
|---|---|---|
| 6,327,573 B1 | 12/2001 | Walker et al. |
| 6,343,317 B1 | 1/2002 | Glorikian |
| 6,356,879 B2 | 3/2002 | Aggarwal et al. |
| 6,421,669 B1 | 7/2002 | Gilmour et al. |
| 6,433,795 B1 | 8/2002 | MacNaughton et al. |
| 6,446,076 B1 | 9/2002 | Burkey et al. |
| 6,449,344 B1 | 9/2002 | Goldfinger et al. |
| 6,466,917 B1 | 10/2002 | Goyal et al. |
| 6,549,768 B1 | 4/2003 | Fraccaroli |
| 6,553,310 B1 | 4/2003 | Lopke |
| 6,571,279 B1 | 5/2003 | Herz et al. |
| 6,606,657 B1 | 8/2003 | Zilberstein et al. |
| 6,618,593 B1 | 9/2003 | Drutman et al. |
| 6,647,257 B2 | 11/2003 | Owensby |
| 6,647,384 B2 | 11/2003 | Gilmour |
| 6,690,918 B2 | 2/2004 | Evans et al. |
| 6,714,931 B1 | 3/2004 | Papierniak et al. |
| 6,745,178 B1 | 6/2004 | Emens et al. |
| 6,819,919 B1 | 11/2004 | Tanaka |
| 6,834,195 B2 | 12/2004 | Brandenberg et al. |
| 6,845,370 B2 | 1/2005 | Burkey et al. |
| 6,859,686 B2 | 2/2005 | Johnson |
| 6,879,994 B1 | 4/2005 | Matsliach et al. |
| 6,968,178 B2 | 11/2005 | Pradhan et al. |
| 6,968,179 B1 | 11/2005 | De Vries |
| 7,013,326 B1 | 3/2006 | Suzuki et al. |
| 7,069,308 B2 | 6/2006 | Abrams |
| 7,071,842 B1 | 7/2006 | Brady, Jr. |
| 7,096,030 B2 | 8/2006 | Huomo |
| 7,103,370 B1 | 9/2006 | Creemer |
| 7,109,859 B2 | 9/2006 | Peeters |
| 7,177,880 B2 | 2/2007 | Ruvolo et al. |
| 7,181,412 B1 | 2/2007 | Fulgoni et al. |
| 7,190,960 B2 | 3/2007 | Wilson et al. |
| 7,200,592 B2 | 4/2007 | Goodwin et al. |
| 7,203,502 B2 | 4/2007 | Wilson et al. |
| 7,236,976 B2 | 6/2007 | Breitenbach et al. |
| 7,243,130 B2 | 7/2007 | Horvitz et al. |
| 7,284,033 B2 | 10/2007 | Jhanji |
| 7,299,217 B2 | 11/2007 | Oni |
| 7,299,222 B1 | 11/2007 | Hogan et al. |
| 7,305,350 B1 | 12/2007 | Bruecken |
| 7,310,676 B2 | 12/2007 | Bourne |
| 7,324,957 B2 | 1/2008 | Boys |
| 7,337,456 B1 | 2/2008 | Nihei |
| 7,343,317 B2 | 3/2008 | Jokinen et al. |
| 7,343,365 B2 | 3/2008 | Farnham et al. |
| 7,359,688 B2 | 4/2008 | Seo et al. |
| 7,359,894 B1 | 4/2008 | Liebman et al. |
| 7,383,243 B2 | 6/2008 | Conkwright et al. |
| 7,392,057 B2 | 6/2008 | Lee |
| 7,403,939 B1 | 7/2008 | Virdy |
| 7,424,541 B2 | 9/2008 | Bourne |
| 7,468,729 B1 | 12/2008 | Levinson |
| 7,469,139 B2 | 12/2008 | van de Groenendaal |
| 7,484,176 B2 | 1/2009 | Blattner et al. |
| 7,496,623 B2 | 2/2009 | Szeto et al. |
| 7,532,900 B2 | 5/2009 | Wilson et al. |
| 7,533,083 B2 | 5/2009 | Aoki et al. |
| 7,545,784 B2 | 6/2009 | Mgrdechian et al. |
| 7,630,986 B1 | 12/2009 | Herz et al. |
| 7,636,779 B2 | 12/2009 | Hayashi et al. |
| 7,668,832 B2 | 2/2010 | Yeh et al. |
| 7,669,135 B2 | 2/2010 | Cunningham et al. |
| 7,685,530 B2 | 3/2010 | Sherrard et al. |
| 7,689,556 B2 | 3/2010 | Garg et al. |
| 7,707,520 B2 | 4/2010 | Ashtekar et al. |
| 7,721,216 B2 | 5/2010 | Zaner et al. |
| 7,831,384 B2 | 11/2010 | Bill |
| 7,860,758 B2 | 12/2010 | McCrossin et al. |
| 8,005,906 B2 | 8/2011 | Hayashi et al. |
| 8,019,692 B2 | 9/2011 | Rosen |
| 2002/0016740 A1 | 2/2002 | Ogasawara |
| 2002/0023132 A1 | 2/2002 | Tornabene et al. |
| 2002/0023230 A1 | 2/2002 | Bolnick et al. |
| 2002/0046259 A1 | 4/2002 | Glorikian |
| 2002/0059092 A1 | 5/2002 | Naito et al. |
| 2002/0116330 A1 | 8/2002 | Hed et al. |
| 2002/0116466 A1 | 8/2002 | Trevithick et al. |
| 2002/0124053 A1 | 9/2002 | Adams et al. |
| 2002/0147619 A1 | 10/2002 | Floss et al. |
| 2002/0155844 A1 | 10/2002 | Rankin et al. |
| 2002/0160766 A1 | 10/2002 | Portman et al. |
| 2002/0194061 A1 | 12/2002 | Himmel et al. |
| 2003/0007464 A1 | 1/2003 | Balani |
| 2003/0050977 A1 | 3/2003 | Puthenkulam et al. |
| 2003/0061201 A1 | 3/2003 | Grefenstette et al. |
| 2003/0100993 A1 | 5/2003 | Kirshenbaum et al. |
| 2003/0137419 A1 | 7/2003 | Gehlot et al. |
| 2003/0137424 A1 | 7/2003 | Gehlot et al. |
| 2003/0148775 A1 | 8/2003 | Spriestersbach et al. |
| 2003/0167324 A1 | 9/2003 | Farnham et al. |
| 2003/0171977 A1 | 9/2003 | Singh et al. |
| 2004/0002348 A1 | 1/2004 | Fraccaroli |
| 2004/0009750 A1 | 1/2004 | Beros et al. |
| 2004/0014486 A1 | 1/2004 | Carlton et al. |
| 2004/0088315 A1 | 5/2004 | Elder et al. |
| 2004/0088322 A1 | 5/2004 | Elder et al. |
| 2004/0088325 A1 | 5/2004 | Elder et al. |
| 2004/0093325 A1 | 5/2004 | Banerjee et al. |
| 2004/0111360 A1 | 6/2004 | Albanese |
| 2004/0116119 A1 | 6/2004 | Lewis et al. |
| 2004/0120298 A1 | 6/2004 | Evans et al. |
| 2004/0122681 A1 | 6/2004 | Ruvolo et al. |
| 2004/0122803 A1 | 6/2004 | Dom et al. |
| 2004/0122855 A1 | 6/2004 | Ruvolo et al. |
| 2004/0128152 A1 | 7/2004 | Austin et al. |
| 2004/0162830 A1 | 8/2004 | Shirwadkar et al. |
| 2004/0185885 A1 | 9/2004 | Kock |
| 2004/0203616 A1 | 10/2004 | Minear et al. |
| 2004/0203719 A1 | 10/2004 | Ross et al. |
| 2004/0203901 A1 | 10/2004 | Wilson et al. |
| 2004/0215793 A1 | 10/2004 | Ryan et al. |
| 2005/0054352 A1 | 3/2005 | Karaizman |
| 2005/0096084 A1 | 5/2005 | Pohja |
| 2005/0108213 A1 | 5/2005 | Riise et al. |
| 2005/0113137 A1 | 5/2005 | Rodriguez et al. |
| 2005/0146417 A1 | 7/2005 | Sweatte |
| 2005/0159970 A1 | 7/2005 | Buyukkokten et al. |
| 2005/0172001 A1 | 8/2005 | Zaner et al. |
| 2005/0221807 A1 | 10/2005 | Karlsson et al. |
| 2006/0047825 A1 | 3/2006 | Steenstra et al. |
| 2006/0064346 A1 | 3/2006 | Steenstra et al. |
| 2006/0064404 A1 | 3/2006 | Kishore et al. |
| 2006/0074883 A1 | 4/2006 | Teevan et al. |
| 2006/0117376 A1 | 6/2006 | Maes |
| 2006/0155765 A1 | 7/2006 | Takeuchi et al. |
| 2006/0161599 A1 | 7/2006 | Rosen et al. |
| 2006/0170945 A1 | 8/2006 | Bill |
| 2006/0235873 A1 | 10/2006 | Thomas |
| 2006/0242129 A1 | 10/2006 | Libes et al. |
| 2006/0256008 A1 | 11/2006 | Rosenberg |
| 2006/0270419 A1 | 11/2006 | Crowley et al. |
| 2006/0271518 A1 | 11/2006 | Wang et al. |
| 2007/0005750 A1 | 1/2007 | Lunt et al. |
| 2007/0032244 A1* | 2/2007 | Counts et al. ............... 455/456.1 |
| 2007/0118520 A1 | 5/2007 | Bliss et al. |
| 2007/0130153 A1 | 6/2007 | Nachman et al. |
| 2007/0174243 A1 | 7/2007 | Fritz |
| 2007/0260741 A1 | 11/2007 | Bezancon |
| 2007/0281689 A1 | 12/2007 | Altman et al. |
| 2007/0293958 A1 | 12/2007 | Stehle et al. |
| 2008/0005072 A1 | 1/2008 | Meek et al. |
| 2008/0007399 A1 | 1/2008 | Hart |
| 2008/0059455 A1* | 3/2008 | Canoy et al. ....................... 707/5 |
| 2008/0102856 A1 | 5/2008 | Fortescue et al. |
| 2008/0104227 A1 | 5/2008 | Birnie et al. |
| 2008/0140650 A1 | 6/2008 | Stackpole |
| 2008/0168033 A1 | 7/2008 | Ott, IV et al. |
| 2008/0288355 A1 | 11/2008 | Rosen |
| 2009/0164309 A1 | 6/2009 | Mgrdechian et al. |
| 2010/0185580 A1 | 7/2010 | Zhu et al. |
| 2011/0159890 A1 | 6/2011 | Fortescue et al. |

FOREIGN PATENT DOCUMENTS

| | | |
|---|---|---|
| EP | 1265151 A2 | 12/2002 |
| GB | 2375921 A | 11/2002 |

| | | | |
|---|---|---|---|
| GB | 2388493 A | 11/2003 |
| JP | 2006-078298 A | 3/2006 |
| JP | 2006098512 A | 4/2006 |
| KR | 2003-0063757 | 7/2003 |
| KR | 2003-0079472 A | 10/2003 |
| KR | 1020040073803 A | 8/2004 |
| KR | 2005-0104134 A | 11/2005 |
| KR | 1020060050397 A | 5/2006 |
| KR | 10-0622543 B1 | 9/2006 |
| WO | 9013828 A1 | 11/1990 |
| WO | 0115480 A1 | 3/2001 |
| WO | 0201405 A1 | 1/2002 |
| WO | 0228125 A2 | 4/2002 |
| WO | 0237323 A1 | 5/2002 |
| WO | 02062092 A1 | 8/2002 |
| WO | 2005/114970 A2 | 12/2005 |
| WO | 2006044939 A2 | 4/2006 |
| WO | 2006044939 A3 | 7/2006 |

OTHER PUBLICATIONS

"A Sneak Preview of the Christian Connection Matchmaker Match Page," Feb. 23, 1999, 2 pages http://web.archive.org/web/19990223221053/www.christian.matchmaker.com/ppmatch.
"A Sneak Preview of the Christian Connection Matchmaker Search Page," May 8, 1999, 2 pages http://www.webarchive.org/web/1990508232314/www.christian.matchmaker.com/ppsearch.
FAQs: About the ZeroDegrees Service, ZeroDegrees.com, Sep. 8, 2004, 35 pages http://www.zerodegrees.com/faq.htm.
"The Pupose Principles and Process," Feb. 24, 1993, 3 pages http://web.archive.org/web/19990224045035/www.christian.matchmaker.com/process.
"Welcome to the Christian Connection Matchmaker," Feb. 22, 1999, 1 page http://web.archive.org/web/19990222170152/www.christian.email.net/index.html.
"Welcome to the Christian Matchmaker," Feb. 21, 1999, 1 page http://web.archive.org/web/1990221092342/www.christian.matchmaker.com/main.
"Yahoo! Groups—What is the spam policy in Yahoo! Groups? How do I avoid spam?," Oct. 24, 2002, 1 page http://web.archive.org/web/20021024130230/help.yahoo.com/help/us/groups/groups-05.html
"Yahoo! Groups: What is a Group?," Yahoo.com, 1 page, Nov. 3, 2002 http://web.archive.org/web/20021103223155/www.yahoo.com/r/ub.
"Yahoo! Groups: Getting Started, Groups Account, Groups Features," Yahoo.com, Oct. 17, 2002, 2 pages http://web.archive.org/web/20021017061719/http://help.yahoo.com/help/groups.
Cranor, Lorrie F. et al., "Spam," Communications of the ACM, Aug. 1998, 41(8):74-83.
Dragan, Richard V., "Tribe.net (beta)," PC Magazine, Jan. 20, 2004 5 pages http://www.pcmag.com/article2/0,1759,1418688,00.asp.
Ethier, Jason, "Current Research in Social Network Theory," 10 pages http://upaya.soc.neu.edu/archive/students/Ethier-SocialNetworks.html (accessed Apr. 18, 2004).
Hines, Matt, "America Online proposes Love.com," CNET News.com, Dec. 10, 2003, 3 pages http://news.com.com/2100-1032-5118986.html.
Hines, Matt, "AOL serves up software for BREW" CNET News.com, Dec. 9, 2003, 3 pages http://news.com.com/2100-1038-5117686.html.
Jordan, Ken et al., "The Augmented Social Network: Building Identity and Trust into the Next-generation Internet," First Monday: Peer Reviewed Journal on the Internet, 62 pages www.firstmonday.dk/issues/issue8_8/jordan/ (accessed Mar. 11, 2004).
"Matchmaker.com Disclaimer," matchmaker.com, 4 pages, Apr. 20, 2000 http://web.archive.org/web/20000420114350/www.christian.matchmaker.com/rules.
"Member Site Selection Page," matchmaker.com, 2 pages, Feb. 19, 1999 http://web.archive.org/web/19990219183131/matchmaker.com/newtry.shtml.
Merrick, Amy, "The Best Way to . . . Find a Date—Ok, so true love isn't guaranteed; But there are wayt to better the odds," The Wall Street Journal, New York, NY, Nov. 27, 20000, 5 pages, ProQuest ID 64669169.
Mullaney, Timothy J., "Diller's Latest Little Bet on the Net," BusinessWeek Online, Mar. 1, 2004, 2 pages http://www.businessweek.com/print/technology/content/mar2004/tc2004031_2820_tc199.h...
"Home Page" myspace.com, 1 page http://www.myspace.com/index.cfm?fuseaction=splash&MyToken=b33c4b2b-0b66-428e-9d0c-84028c7... (accessed Jun. 22, 2006).
"About Us," myspace.com, 1 page http://www.myspace.com/index.cfm?fuseaction=misc.aboutus (accessed Aug. 14, 2008).
"Mobile Phone Technology Opens up New Revenue Streams," Zi Corporation White Paper, May 2005, 5 pages.
"Qix Benefits," Zi Corporation, 2 pages, http://www.zicorp.com/QixBenefits.htm (accessed Apr. 10, 2006).
"Qix Functions," Zi Corporation, 2 pages, http://www.zicorp.com/QixFunctions.htm (accessed Apr. 10, 2006).
International Preliminary Report on Patentability for International Patent Application No. PCT/US2007/070520 mailed May 14, 2009.
International Search Report and Written Opinion for International Patent Application No. PCT/US2007/086603 mailed Apr. 25, 2008.
International Preliminary Report on Patentability for International Patent Application No. PCT/US2007/086603 mailed Jul. 16, 2009.
International Search Report for International Patent Application No. PCT/US2007/066816 mailed Aug. 6, 2008.
International Preliminary Report on Patentability for International Patent Application No. PCT/US2007/066816 mailed Nov. 6, 2008.
Official Communication for Australian Patent Application No. 2007342244 mailed May 11, 2010.
Official Communication for Chinese Patent Application No. 200780015463.3 mailed May 12, 2010.
Official Communication for Japanese Patent Application No. 2009-507895 mailed Jan. 31, 2011.
Official Communication for Japanese Patent Application No. 2009-507895 mailed Aug. 29, 2011.
Official Communication for Korean Patent Application No. 10-2009-7011168 mailed Jan. 20, 2011.
Official Communication for Korean Patent Application No. 10-2009-7016407 mailed Jul. 30, 2010.
Official Communication for Korean Patent Application No. 10-2009-7016407 mailed Feb. 28, 2011.
Official Communication for Korean Patent Application No. 10-2008-7026557 mailed Jan. 6, 2010.
Official Communication for U.S. Appl. No. 11/380,868 mailed Aug. 19, 2008.
Official Communication for U.S. Appl. No. 11/380,868 mailed Feb. 20, 2009.
Official Communication for U.S. Appl. No. 11/380,868 mailed Jun. 15, 2009.
Official Communication for U.S. Appl. No. 11/380,868 mailed Jul. 8, 2009.
Official Communication for U.S. Appl. No. 11/380,868 mailed Oct. 29, 2009.
Official Communication for U.S. Appl. No. 11/555,675 mailed Aug. 13, 2008.
Official Communication for U.S. Appl. No. 11/555,675 mailed Mar. 4, 2009.
Official Communication for U.S. Appl. No. 11/555,675 mailed May 27, 2009.
Official Communication for U.S. Appl. No. 11/555,675 mailed Jul. 7, 2009.
Official Communication for U.S. Appl. No. 11/555,675 mailed Apr. 1, 2010.
Official Communication for U.S. Appl. No. 11/555,675 mailed Jun. 16, 2010.
Official Communication for U.S. Appl. No. 11/555,675 mailed Nov. 26, 2010.
Official Communication for U.S. Appl. No. 11/620,619 mailed Dec. 8, 2008.
Official Communication for U.S. Appl. No. 11/620,619 mailed Jun. 9, 2009.
Official Communication for U.S. Appl. No. 11/620,619 mailed Oct. 15, 2009.
Official Communication for U.S. Appl. No. 11/620,619 mailed Apr. 14, 2010.

Official Communication for U.S. Appl. No. 12/117,575 mailed Jan. 5, 2010.
Official Communication for U.S. Appl. No. 12/117,575 mailed Jun. 17, 2010.
Official Communication for U.S. Appl. No. 12/117,575 mailed Nov. 24, 2010.
Official Communication for U.S. Appl. No. 12/117,575 mailed Feb. 3, 2011.
Official Communication for U.S. Appl. No. 12/117,575 mailed Apr. 15, 2011.
Official Communication for U.S. Appl. No. 11/555,672 mailed Dec. 23, 2008.
Official Communication for U.S. Appl. No. 11/555,672 mailed Aug. 12, 2009.
Official Communication for U.S. Appl. No. 11/555,672 mailed Mar. 24, 2010.
Official Communication for U.S. Appl. No. 11/555,672 mailed Jun. 3, 2010.
Official Communication for U.S. Appl. No. 11/555,672 mailed Aug. 17, 2010.
Official Communication for U.S. Appl. No. 11/555,672 mailed Mar. 16, 2011.
Official Communication for U.S. Appl. No. 11/555,672 mailed Aug. 11, 2011.
Official Communication for U.S. Appl. No. 11/555,672 mailed Dec. 5, 2011.
Official Communication for Japanese Patent Application No. 2009-535370 mailed Dec. 19, 2011.
European Search Report for European Patent Application No. 07812036.7-1244 mailed May 11, 2012.

* cited by examiner

| Record ID | GPS Coord. X | GPS Coord. Y | Member ID | Location Name | Community | Relevancy Score | Time |
|---|---|---|---|---|---|---|---|
| 1450 | 0.56.25 | 0.56.25 | 1401 | Book Store | (1401, 1402, 1403) | 0.5 | Any |
| 1561 | 1502 | 1503 | 1512 | 1522 | 1532 | 1542 | 1552 |
| 1451 | 0.56.25 | 0.56.25 | 1401 | Music Store | (1401, 1402, 1403) | 0.8 | 12:30 |
| 1562 | 1504 | 1505 | 1513 | 1523 | 1533 | 1543 | 1553 |
| 1452 | 0.56.25 | 0.56.25 | --- | Best Restaurant | (1401, 1402, 1403) | 0.7 | 16:30 |
| 1563 | 1506 | 1507 | 1514 | 1524 | 1534 | 1544 | 1554 |
| 1453 | 0.56.25 | 0.56.25 | --- | 125 Shaftsbury Avenue | --- | --- | --- |
| 1564 | 1508 | 1509 | 1515 | 1525 | 1535 | 1545 | 1555 |

.# DETERMINING MOBILE CONTENT FOR A SOCIAL NETWORK BASED ON LOCATION AND TIME

CROSS-REFERENCE TO RELATED APPLICATION

This utility patent application is a Continuation of allowed U.S. patent application Ser. No. 11/555,675, filed on Nov. 1, 2006, the benefits of which are claimed under 35 U.S.C. §120 and is further incorporated herein by reference.

TECHNICAL FIELD

The present invention relates generally to mobile communications and, more particularly, but not exclusively to providing geographical location description to a mobile client based in part on a social network.

BACKGROUND

Tremendous changes have been occurring in the Internet that influence our everyday lives. For example, online social networks have become the new meeting grounds. They have been called the new power lunch tables and new golf courses for business life in the U.S. Moreover, many people are using such online social networks to reconnect themselves to their friends, their neighborhood, their community, and to otherwise stay in touch.

The development of such online social networks touch countless aspects of our everyday lives, providing instant access to people of similar mindsets, enabling us to form partnerships with more people in more ways than ever before, and providing relevant information to people within our social networks.

Global Positioning System (GPS) technology has improved our ability to detect precise geographical locations. GPS integration into mobile devices enables mobile detection of these locations. However, while GPS technology may provide accurate coordinates, they do not always provide accurate names for the coordinates or provide relevant information about the locations. In particular, location data can be inaccurate, especially down to the street address level. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Embodiments, which is to be read in association with the accompanying drawings, wherein:

FIG. 15 shows an example of a relational data model of location records.

DETAILED DESCRIPTION OF THE INVENTION

Figure 1:
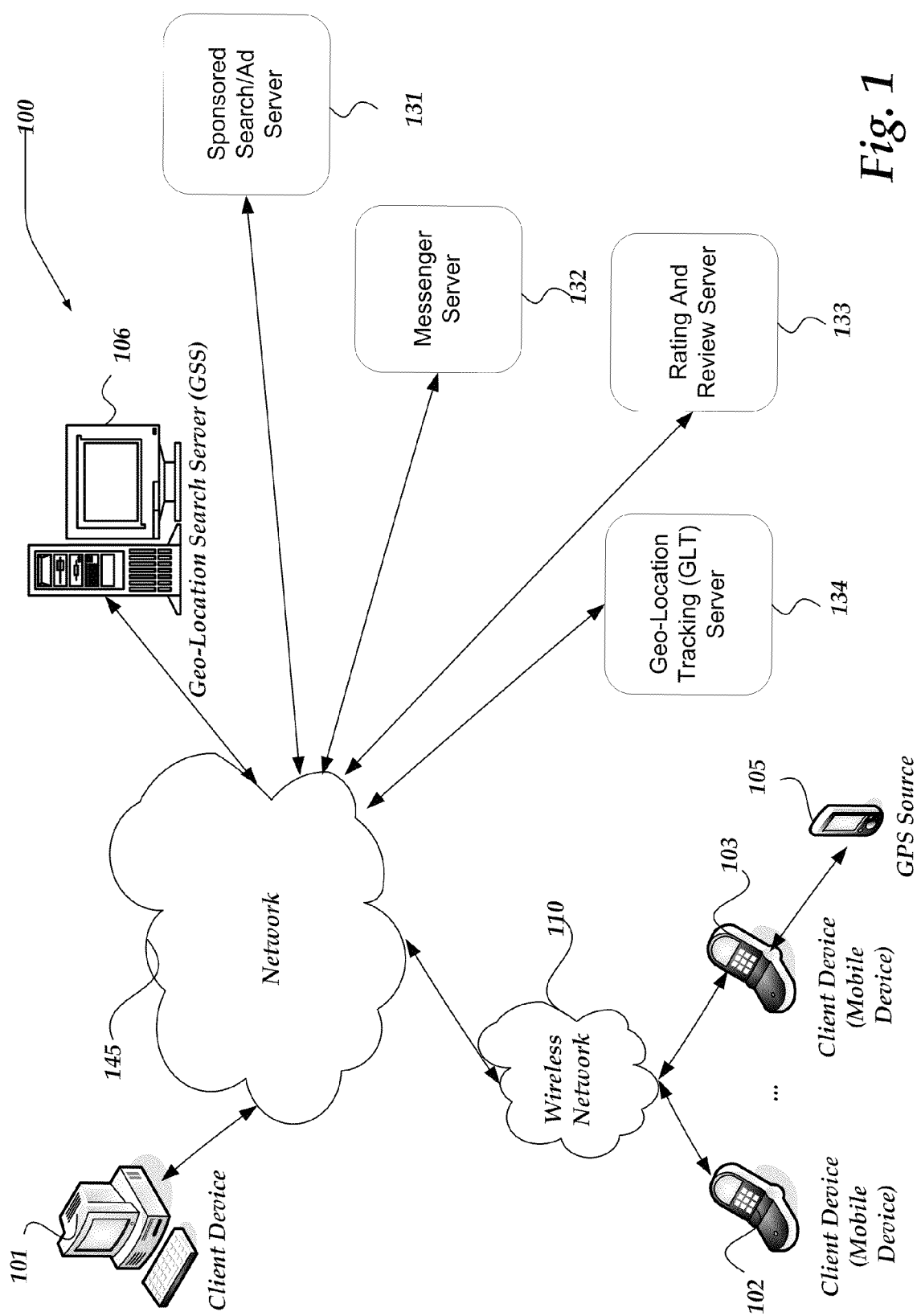
FIG. 1 is a system diagram of one embodiment of an environment in which the invention may be practiced.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "social network" refers to a concept that an individual's personal network of friends, family colleagues, coworkers, and the subsequent connections within those networks, can be utilized to find more relevant connections for a variety of activities, including, but not limited to dating, job networking, service referrals, activity partners, or the like.

A social network typically comprises a person's set of direct and/or indirect personal relationships. Direct personal relationships usually include relationships with family members, friends, colleagues, coworkers, and other people with which the person has had some form of direct contact, such as contact in person, by telephone, by email, by instant message, by letter, or the like. These direct personal relationships are sometimes referred to as first-degree relationships. First-degree relationships can have varying degrees of closeness, trust, and other characteristics.

Indirect personal relationships typically include relationships through first-degree relationships to people with whom a person has not had some form of direct contact. For example, a friend of a friend represents an indirect personal relationship. A more extended, indirect relationship might be a friend of a friend of a friend. These indirect relationships are sometimes characterized by a degree of separation between the people. For instance, a friend of a friend can be characterized as two degrees of separation or a second-degree relationship. Similarly, a friend of a friend of a friend can be characterized as three degrees of separation or a third-degree relationship.

As used herein, the term "GPS coordinate" refers to any value based on a geographical coordinate system provided by a satellite-based radio positioning systems that provide physical positions, velocity and/or time information. The NAVSTAR system, operated by the U.S. Department of Defense, is an example of such a system. A GPS coordinate may include a longitude value, a latitude value, and/or an altitude value (e.g., referenced to a mean sea level). Geographical coordinate systems may express GPS coordinates in, for example, degree/minutes, degree/minutes/seconds, decimal degrees, or the like.

As used herein, the term "geographical coordinate" refers to any value based on a geographical coordinate system provided by lookup mechanism, triangulation mechanism, or by any other location identification system. Lookup mechanisms include IP address to geographical location mappings, MAC address to geographical location mappings, or the like. Triangulation mechanisms include WiFi triangulation, or any other wireless and/or radio triangulation.

As used herein, the term "location name" refers to any information identifying a geographical location. One or more location names may be associated with a GPS coordinate or a range or GPS coordinates. The term "location description" refers to any information about a geographical location, including a tag, comment, remark, or rating about the geographical location, a time relevant to the geographical location, or the like. One or more location descriptions may be associated with a location name. The term "location information" refers to a location name, location description or any other information associated with a location. Location information, a location name, and a location description may be any data, including a word, a set or words, a photograph, a sound bite, video footage, or the like.

As used herein, the term "within a proximity to" refers to two locations being near each other, wherein a measure of nearness may be a relatively small distance based on the scale of the measurement. Thus, for a large scale such as for distances between cities, the measure of nearness may be larger, but for a street level or the like, the measure may be smaller. The measure of nearness may be determined by any geometric measure, including a direct line between the locations, a Manhattan distance between the locations, or even determined by a user, or the like. In another embodiment, "a proximity to" is a predetermined value based on a scaling display value.

As used herein, the term "point" refers to a representation of a geographical location in a text, graphical, audio, or any other media object.

As used herein, the term "relevancy score" refers to information that represents whether a location name is a relevant name, or a commonly used name for a GPS coordinate with respect to a member and/or a community of a social network.

Briefly stated the present invention is directed towards updating location information for the social network and/or to providing the location information from the social network. A request for the location information associated with a GPS coordinate is received from a client device associated with a member of the social network. In response to the request, a location name associated with another member of the social network is provided to the client device based on the GPS coordinate. Another location name may be received from the client device. The other location name may be associated with the GPS coordinate and with the member in the social network. Thus, the GPS coordinate and/or member may be associated with a plurality of location names. A location description may also be received and associated with the location name and with the member in the social network.

A GPS coordinate and a search criterion are received from a client device associated with a member of the social network. The social network is searched for another member associated with a location name based on the GPS coordinate and the search criterion. The location name may be a sponsored advertisement. The location name is provided to the client device. A communication may be enabled between the member and the other member.

Moreover, a start location and end location may also be received. The GPS coordinate and/or search criterion may be associated with either the start location or the end location. The searched location name is used to determine a location of interest. A route is determined between the start location and the end location and through the location of interest. The route is provided to the client device.

Although some methods, system, apparatuses, user interfaces, and data models of some embodiments of the present invention are described below as operating on GPS coordinates, in an alternate embodiment, these methods, system, apparatuses, use interfaces, and data models can be modified to operate substantially similarly on any other mechanism employable to obtain geographical coordinates, without departing from the scope of the invention.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes network 145, wireless network 110, Geo-location Search Server (GSS) 106, mobile devices (client devices) 102-103, client device 101, GPS source 105, rating and review server 133, messenger server 132, and sponsored search/ad server 131.

One embodiment of mobile devices 102-103 is described in more detail below in conjunction with FIG. 2. Generally, however, mobile devices 102-103 may include virtually any portable computing device capable of receiving and sending a message over a network, such as network 145, wireless network 110, or the like. Mobile devices 102-103 may also be described generally as client devices that are configured to be portable. Thus, mobile devices 102-103 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices 102-103 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), and the like, to display and send a message.

Mobile devices 102-103 also may include at least one other client application that is configured to receive content from another computing device. The client application may include a capability to provide and receive textual content, multimedia information, and the like. The client application may further provide information that identifies itself, including a type, capability, name, and the like. In one embodiment, mobile devices 102-103 may uniquely identify themselves through any of a variety of mechanisms, including a phone number, Mobile Identification Number (MIN), an electronic serial number (ESN), or other mobile device identifier. The information may also indicate a content format that the mobile device is enabled to employ. Such information may be provided in a message, or the like, sent to GSS 106, client device 101, or other computing devices.

Mobile devices 102-103 may also be configured to communicate a message, such as through Short Message Service (SMS), Multimedia Message Service (MMS), instant messaging (IM), internet relay chat (IRC), Mardam-Bey's IRC (mIRC), Jabber, and the like, between another computing device, such as GSS 106, client device 101, or the like. However, the present invention is not limited to these message protocols, and virtually any other message protocol may be employed.

Mobile devices 102-103 may be further configured to enable a user to participate in communications sessions, such as IM sessions. As such, mobile devices 102-103 may include a client application that is configured to manage various actions on behalf of the client device. For example, the client application may enable a user to interact with the browser application, email application, IM applications, SMS application, and the like.

Mobile devices 102-103 may further be configured to include a client application that enables the end-user to log into an end-user account that may be managed by another computing device, such as GSS 106. Such end-user account, for example, may be configured to enable the end-user to receive emails, send/receive IM messages, SMS messages, access selected web pages, participate in a social networking activity, or the like. Participation in various social networking activities may also be performed with or without logging into the end-user account.

Mobile devices 102-103 may also communicate with non-mobile client devices, such as client device 101, or the like. In one embodiment, such communications may include participation in social networking activities, including sharing of multimedia information, sharing location information, or the like.

Client device 101 may include virtually any computing device capable of communicating over a network to send and receive information, including social networking information, or the like. The set of such devices may include devices that typically connect using a wired or wireless communications medium such as personal computers, multiprocessor systems, microprocessor-based or programmable consumer electronics, network PCs, or the like. Client device 101 may be configured to perform at least some of the same operations as mobile devices 102-103.

In addition, client devices 101-103 may include another application that is configured to search for location information based on a social network and/or a GPS coordinate(s). Client devices 101-103 may receive the GPS coordinate and/or search criteria from a user of client devices 101-103. Client devices 101-103 may enable the user to enter the GPS coordinate and/or search criteria with, for example, display 1100 of FIG. 11. Client devices 101-103 may send the GPS coordinate and/or search criteria to GSS 106 over networks 110/145, for further processing. Client devices 101-103 may display the search results for locations at or near GPS coordinate using, for example, display 1200 of FIG. 12 and display 1300 of FIG. 13. Client devices 101-103 may also enable the user to update and/or refine location description (e.g., location name, tag, GPS coordinate, time associated with the location) in the social network, using, for example, display 1000 of FIG. 10. Client devices 101-103 may send the updated location description to GSS 106 over network 110/145, for further processing.

Client devices 101-103 may retrieve the GPS coordinate(s) directly through a GPS interface on the client devices 101-103 or through a communication with another device, such as GPS source 105. For example, client device (mobile device) 102 may have an integrated GPS interface for retrieving GPS coordinate(s). Client device (mobile device) 102 may be a Nokia N95 handset with integrated GPS functionality. As shown, client device (mobile device) 103 has a GPS interface configured to communicate with external GPS source 105.

GPS source 105 may include virtually any computing device capable of receiving a GPS coordinate wirelessly, over a network, or the like. GPS source 105 may receive the GPS coordinate from one or more GPS enabled satellites. As shown, mobile device 103 is in communication with GPS source 105. The communication may include a wireless communication, such as Bluetooth, WiFi, IR, or the like. In one embodiment, GPS source 105 may be physically coupled to mobile device 103, via a USB port, serial port, or the like. In any case, the GPS coordinate is sent from GPS source 105 to mobile device 103 for further processing.

Wireless network 110 is configured to couple mobile devices 102-103 and its components with network 145. Wireless network 110 may include any of a variety of wireless sub-networks that may further overlay stand-alone ad-hoc networks, and the like, to provide an infrastructure-oriented connection for mobile devices 102-103. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of Wireless network 110 may change rapidly.

Wireless network 110 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as mobile devices 102-103 with various degrees of mobility. For example, Wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), and the like. In essence, Wireless network 110 may include virtually any wireless communication mechanism by which information may travel between mobile device s 102-103 and another computing device, network, and the like.

Network 145 is configured to couple at least some components of system 100 with each other, including, GSS 106, GLT server 134, rating and review server 133, messenger server 132, and sponsored search/ad server 131, client device 101, and through Wireless network 110 to mobile devices 102-103. Network 145 is enabled to employ any form of computer readable media for communicating information from one electronic device to another. Also, Network 145 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (IS-DNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, Network 145 includes any communication method by which information may travel between GSS 106, client devices 101-103, and other computing devices.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

Devices that may operate as GSS 106, GLT server 134, rating and review server 133, messenger server 132, and sponsored search/ad server 131 include personal computers desktop computers, multiprocessor systems, microprocessor-based or programmable consumer electronics, network PCs, servers, and the like. GSS 106, GLT server 134, rating and review server 133, messenger server 132, and sponsored search/ad server 131 may use signal flows 800 and 900 of FIGS. 8 and 9, respectively, to perform at least some their operations.

One embodiment of GSS 106 is described in more detail below in conjunction with FIG. 3. Briefly, however, GSS 106 may include any computing device capable of connecting to Network 145 to enable users of client devices 101-103 to search for location information based on a social network, GPS coordinate(s), and/or search criteria. GSS 106 may provide the location description as search result(s) (e.g., maps, lists), routes associated with the GPS coordinate(s), sponsored advertisements associated with the GPS coordinate(s), or the like.

Additionally, GSS 106 may also enable users of client devices 101-103 to enter/update the location description. GSS 106 may also manage the social network. In one embodiment, GLT server 134 may enable the members to define their communities (e.g., by adding members to the community, by defining a maximum size of the community, a maximum degree of separation between members of the community, or the like).

Moreover, GSS 106 may use services provided by GLT server 134, rating and review server 133, messenger server 132, and/or sponsored search/ad server 131 to perform at least some of its operations. For example, GSS 106 may request a rating/review of a location from rating and review server 133. GSS 106 may enable a communication between members of the social network by routing communications through messenger server 132. GSS 106 may receive sponsored advertisements for a GPS coordinate from sponsored search/ad server 131.

GSS 106 may also identify the geographical location of each one of client devices 101-103 via GPS coordinates sent from client devices 101-103, IP addresses, MAC addresses, or the like of client devices 101-103, or a user entered geographical location. GSS 106 may use the geographical location(s) to determine whether two or more of client devices 101-103 are within a proximity to each other. Devices determined to be within a proximity to each other are enabled to communicate with each other via messenger server 132, or the like. GSS 106 may use at least some steps of processes 400, 500, 600, and 700 of FIGS. 4, 5, 6, and 7, respectively to perform at least some its operations.

GLT server 134 is configured to associate a GPS coordinate(s) with location information. In one embodiment, GLT server 134 may enable members of a social network to search, retrieve, and update/enter location information. In one embodiment, GLT server 134 may associate the location information with the GPS coordinate(s) and with the members in a social network data structure, in a database, or the like. One example of a social network data structure managed by GLT server 134 is social network 1400 of FIG. 14. One example of a table in a database of location information is table 1500 of FIG. 15. In one embodiment, the database may be a default database used to provide location information if information is not found in the social network. In one embodiment, GLT 134 may also manage at least some of the associations between location names and location information in the social network, database, or the like. GLT server 134 may also enable GSS 106 to search, retrieve, and update/enter location information.

Rating and review server 133 is configured to manage rating and/or reviews associated with a geographical location. Rating and review server 133 may enable GSS 106 to send a rating/review for the geographical location to update the rating/review, over network 145, or the like. Rating and review server 133 may enable GSS 106 to send a request to retrieve the rating/review for the geographical location.

Messenger server 132 is configured to relay messages between two or more of client devices 101-103. Messenger server 132 may relay IM, SMS, email, and/or VOIP messages, or otherwise enable a communication between two or more of client devices 101-103. In one embodiment, messenger serve 132 may forward a message between the two or more of client devices 101-103. In one embodiment, messenger server 132 may enable an initiation of the communication, and subsequently client devices 101-103 may communicate messages directly with each other. For example, messenger server 132 may send phone numbers of two or more of client device 101-103 to client device 101-103 to enable the users of client devices 101-103 to call each other. Messenger server 132 may use at least some steps of process 700 of FIG. 7 to perform at least some its operations.

Sponsored search/ad server 131 is configured to receive payment from a sponsor for enabling storing, searching and providing of sponsored search results. The sponsored search results may location information. In one embodiment, the sponsor may be a member of the social network. Sponsored search/ad server 131 may be configured to associate one or more key words with a search result, geographical location, GPS location, location name, or the like. Sponsored search/ad server 131 may manage user accounts of sponsors, track the effectiveness of the sponsored search results, or the like. Sponsored search/ad server 131 may also be configured to provide to GSS 106, over network 145, the sponsored search results/ads in response to the one or more keywords. For example, in one embodiment, the key words may be part of a search criteria submitted by a user of one of client devices 101-103. GSS 106 may search for the key words through the user's social network, or may request sponsored search/ad server 131, over network 145, to return a sponsored search result/ad associated with the keywords. A plurality of search results provided to one of client devices 101-103 may be a combination of the sponsored search results and other search results. Sponsored search/ad server 131 may use at least some steps of processes 400 of FIG. 4 to perform at least some its operations.

Although FIG. 1 illustrates GSS 106, GLT server 134, rating and review server 133, messenger server 132, and sponsored search/ad server 131 as separate devices, the invention is not so limited. For example, functions of some or all of these servers may be combined into a single component, or a plurality of components included in a single computing device, without departing from the scope of the present invention. Accordingly, GSS 106, GLT server 134, rating and review server 133, messenger server 132, and sponsored search/ad server 131 may describe components (e.g. a GSS component, a GLT component, a rating and review component, or the like) of a device.

Similarly, although GSS 106 is shown as a single computing device, the invention is not so limited. For example, one or more functions of GSS 106 may be distributed across one or more distinct computing devices. For example, managing various social networking activities, including adding members to a social network, sharing of information with members of the social network, managing Instant Messaging (IM) session, SMS messages, email messages, sharing of contact information, aggregating and/or storing of social networking information, or the like, may be performed by a plurality of computing devices, without departing from the scope or spirit of the present invention.

Illustrative Client Environment

Figure 2:
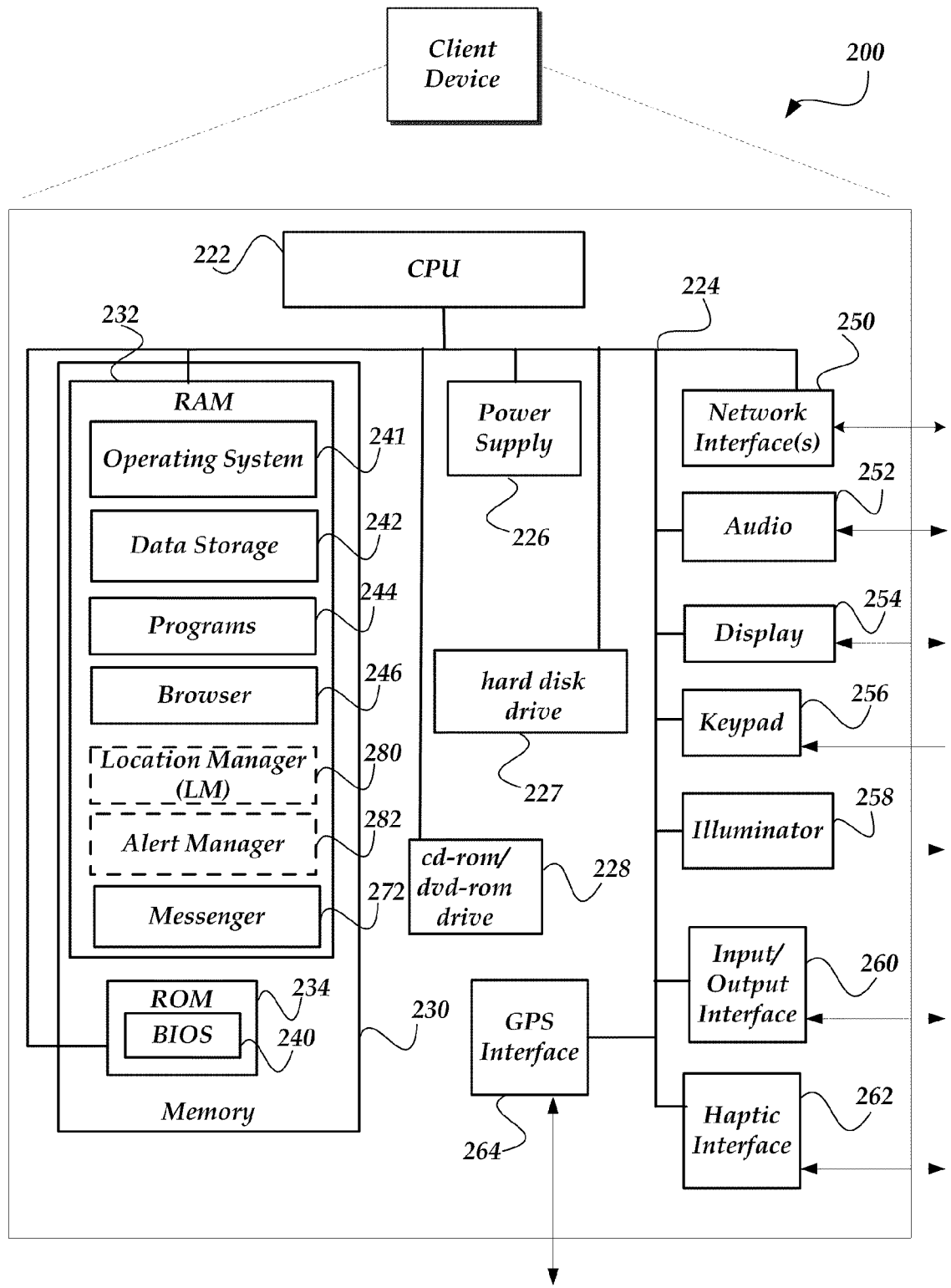
FIG. 2 shows one embodiment of a client device that may be included in a system implementing the invention.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. As shown in the figure, client device 200 includes a processing unit 222 in communication with a mass memory 230 via a bus 224.

Client device 200 also includes a power supply 226, one or more network interfaces 250, an audio interface 252, a display 254, a keypad 256, an illuminator 258, an input/output interface 260, a haptic interface 262, and a global positioning systems (GPS) interface 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, and the like.

Audio interface 252 is arranged to produce and receive audio signals such as the sound of a human voice, music, or the like. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Client device 200 may further include additional mass storage facilities such as CD-ROM/DVD-ROM drive 228 and hard disk drive 227. Hard disk drive 227 is utilized by client device 200 to store, among other things, application programs, databases, and the like. Additionally, CD-ROM/DVD-ROM drive 228 and hard disk drive 227 may store cookies, data, images, or the like.

Keypad 256 may comprise any input device arranged to receive input from a user (e.g., a sender). For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, and the like. Haptic interface 262 is arranged to provide tactile feedback to a user (e.g., a sender) of the client device. For example, the haptic interface may be employed to vibrate client device 200 in a particular way when another user of a computing device is calling.

In one embodiment, GPS interface 264 may be a GPS transceiver for receiving a GPS coordinate(s). Thus, GPS interface 264 can determine the physical coordinates of client device 200 on the surface of the Earth. GPS interface 264 can also employ other geo-positioning mechanisms, including, but not limited to, (WiFi) triangulation, Assisted GPS (AGPS), Enhanced Observed Time Difference (E-OTD), Cell Identity (CI), Service Area Identity (SAI), ETA, BSS and the like, to further determine the physical location of client device 200 on the surface of the Earth. In an alternate embodiment, GPS interface 264 may be configured to provide geographical coordinate(s) besides GPS coordinate(s), for example, coordinates provided by WiFi triangulation or the like. It is understood that under different conditions, GPS interface 264 can determine a physical location within millimeters for client device 200; and in other cases, the determined physical location may be less precise, such as within a meter or significantly greater distances.

In an alternate embodiment, GPS interface 264 may be a Bluetooth transceiver for receiving a GPS coordinate(s) from another device. The other device may be a GPS source, such as GPS source 105 of FIG. 1. The other device may include another GPS transceiver for receiving the GPS coordinate(s) from a GPS enabled satellite, or the like, and may send the GPS coordinate(s) to client device 200. The GPS coordinate(s) may be either pushed to, or pulled from (requested by) client device 200.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of UNIX, or LINUX™, or a specialized client communication operating system such as Windows Mobile™, or the Symbian® operating system. The operating system may include an interface with a Java virtual machine module that enables control of hardware components and/or operating system operations via Java application programs.

Client device 200 may also be configured to manage activities and data for one user distinct from activities and data for another user of client device 200. For example, in one embodiment, operating system 241 may be configured to manage multiple user accounts. For example, client device 200 may employ an operating system that is configured to request a user to provide account information, such as a user name/password, smart card, s/key, or the like. When the user logs into the associated account, operating system 241 may then manage data, activities, and the like, for the user separate from at least some of the data, activities, and the like, for another user. Thus, in one embodiment, operating system 241 may be configured to store client device data, cookies, social networking data, location information data, or the like, based on a client device account. Moreover, settings, configurations, or the like, of browser 246, messenger 272, or the like, may be based on the user account. Thus, when user A is logged into their client user account, browser 246 may receive, store, and/or retrieve cookies for user A, distinct from cookies associated with another user account on client device 200.

Memory 230 further includes one or more data storage 242, which can be utilized by client device 200 to store, among other things, programs 244 and/or other data. For example, data storage 242 may also be employed to store information that describes various capabilities of client device 200. The information may then be provided to another device based on any of a variety of events, including being sent as part of a header during a communication, sent upon request, and the like. Moreover data storage 242 may be used to store information such as data received over a network from another computing device, data output by a client application on client device 200, data input by a user of client device 200, or the like. For example, data storage 242 may include data, including cookies, and/or other client device data sent by a network device. Data storage 242 may also include image files, social networking data, location information data, or the like, for display and/or use through various applications. Moreover, although data storage 242 is illustrated within memory 230, data storage 242 may also reside within other storage mediums, including, but not limited to CD-ROM/DVD-ROM drive 228, hard disk drive 227, or the like.

Programs 244 may also include computer executable instructions which, when executed by client device 200, transmit, receive, and/or otherwise process messages and enable telecommunication with another user of another client device. Other examples of application programs include calendars, contact managers, task managers, transcoders, database programs, word processing programs, spreadsheet programs, games, CODEC programs, and so forth. In addition, mass memory 230 stores browser 246, and messenger 272.

Browser 246 may be configured to receive and to send web pages, forms, web-based messages, and the like. Browser 246 may, for example, receive and display (and/or play) graphics, text, multimedia, audio data, and the like, employing virtually any web based language, including, but not limited to Standard Generalized Markup Language (SGML), such as Hyper-Text Markup Language (HTML), a wireless application protocol (WAP), a Handheld Device Markup Language (HDML), such as Wireless Markup Language (WML), WMLScript, JavaScript, and the like. Browser 246 may also be configured to receive, store, and/or provide data. For example, in one embodiment, browser 246 may receive and store client device data in the form of a cookie, or the like.

Messenger 272 may be configured to initiate and manage a messaging session using any of a variety of messaging communications including, but not limited to email, Short Message Service (SMS), Instant Message (IM), Multimedia Message Service (MMS), internet relay chat (IRC), mIRC, and the like. For example, in one embodiment, messenger 272 may be configured as an IM application, such as AOL Instant Messenger, Yahoo! Messenger, .NET Messenger Server, ICQ, or the like. In another embodiment, messenger 272 may be a client application that is configured to integrate and employ a variety of messaging protocols.

Figure 11:
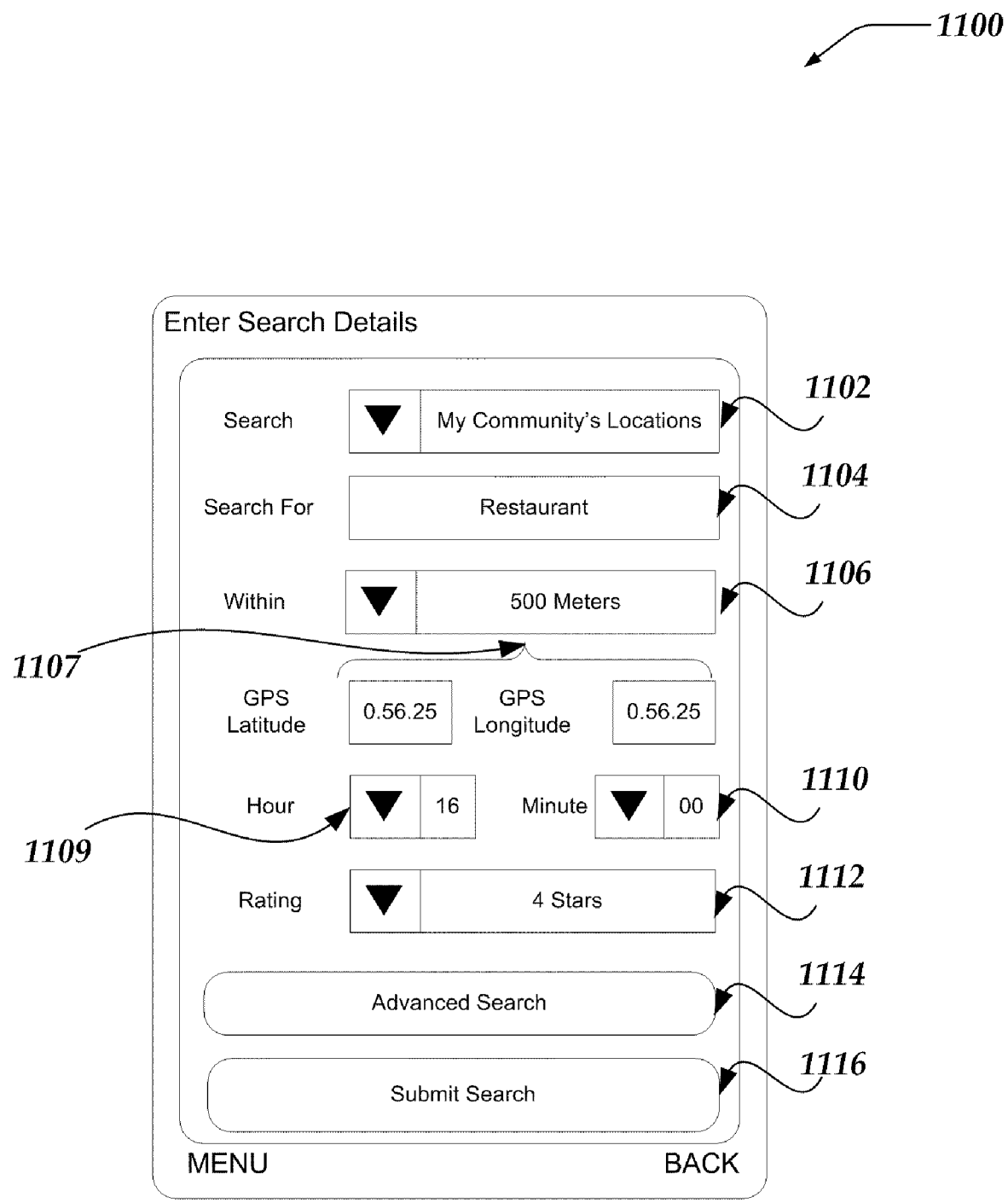
FIG. 11 shows one embodiment of a display for searching the social network for location information.

Location manager 280 may be configured to enable a user of client device 200 to search for location information based on the user's membership in a social network, a GPS coordinate associated with client device 200 and/or other search criteria. LM 280 may communicate with a geo-location search server such as GSS 106 of FIG. 1, over network interface 250, to request a search result, or the like. Display 1100 of FIG. 11 shows an example of an interface that LM 280 may present to the user to enable entering the search criteria. Display 1200, and 1300 of FIGS. 12, and 13 respectively, show examples of LM 280 presenting search results to the user. LM 280 may present the search result through a proprietary display program, through the use of browser 246, or the like.

Moreover, LM 280 may be configured to enable a user to enter/update location information associated with a GPS coordinate associated with the user in the social network. LM 280 may use display 1000 of FIG. 10 to enable a user to enter/update the location information. As shown, LM 280 is optional, and at least some of the functionality of LM 280 may be provided directly through server side services (e.g., web pages) communicating with device 200 through browser 246 and/or network interface(s) 250.

Alert manager 282 may be configured to automatically receive search result(s) based on the user's membership in a social network, a GPS coordinate associated with client device 200 and/or search criteria. Alert manager 282 may receive a push of the search result(s) over network interface 250, or the like. Alert manager 282 may be configured by user preferences to receive, block or ignore the pushed search result(s). Alert manager 282 may send the pushed search result(s) to LM 280 and/or browser 246, for display. As shown, alert manager 282 is optional, and at least some of the functionality of alert manager 282 may be provided directly through server side services (e.g., web pages) communicating with device 200 through browser 246 and/or network interface(s) 250.

Although LM 280 and alert manager 282 are described as operating on GPS coordinates, in an alternate embodiment, these components can be modified to operate substantially similarly with any geographical coordinates using any of a variety of other mechanisms without departing from the scope of the invention. For example, LM 280 may manage entry/update of geographical coordinates into the social network, and alert manager 282 may be configured to receive and provide the geographical coordinates.

Illustrative Server Environment

Figure 3:
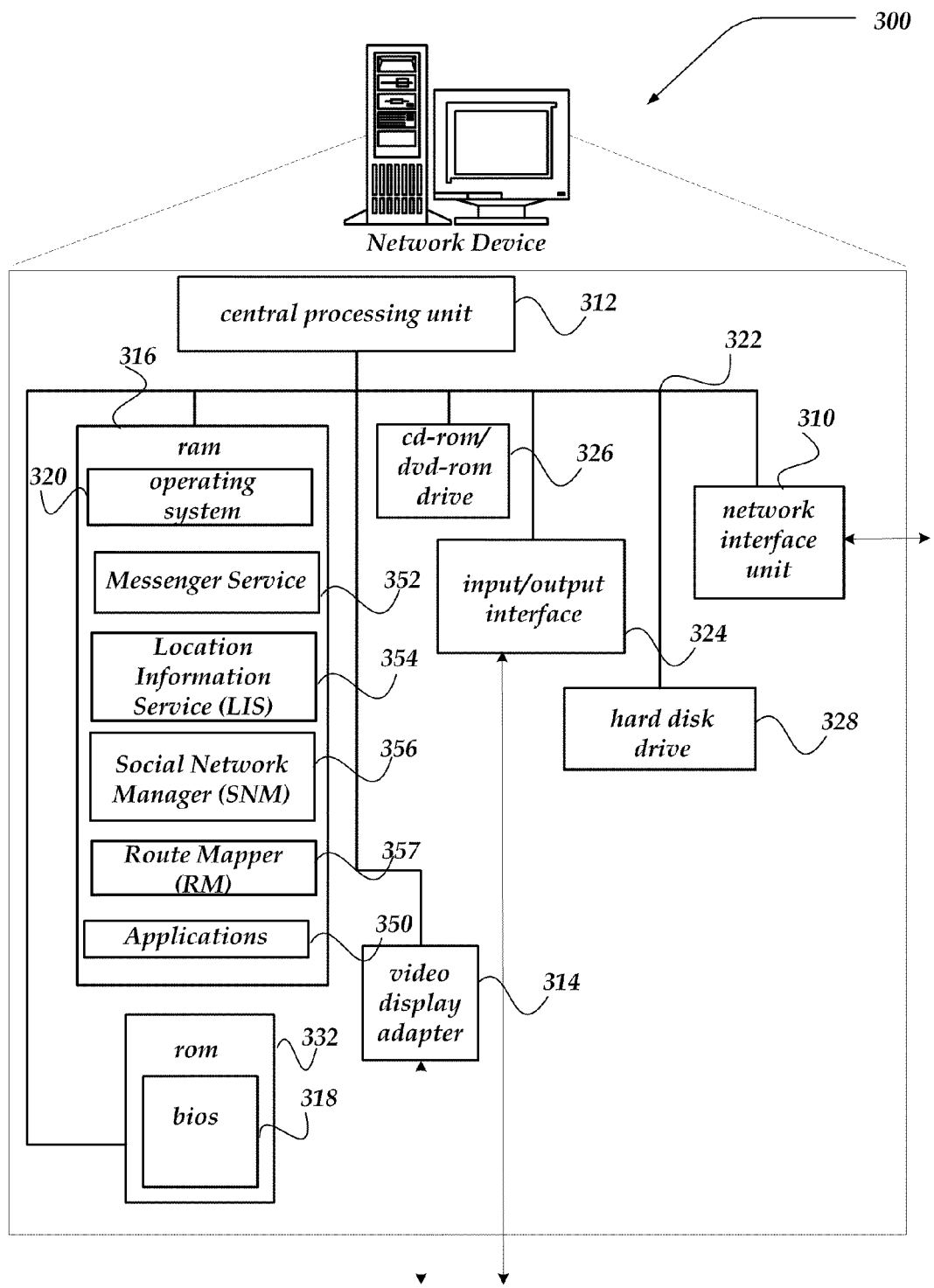
FIG. 3 shows one embodiment of a network device that may be included in a system implementing the invention.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, GSS 106 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs may include transcoders, schedulers, calendars, database programs, word processing programs, HTTP programs, customizable user interface programs, IPSec applications, encryption programs, security programs, VPN programs, SMS message servers, IM message servers, email servers, account management and so forth.

Location Information Service (LIS) 354 may include any component configured to search, provide, update, enter, or otherwise manage location information, including GPS coordinates and/or other location information associated with GPS coordinates and with members in the social network. LIS 354 may receive the location information over network interface 310, or the like. In one embodiment, LIS 354 may associate the location information with the GPS coordinate(s) and with the member in a social network data structure, such as social network 1400 of FIG. 14, in a database table(s) such as table 1500 of FIG. 15, or the like. The social network data structure or database may be stored within, for example, hard disk drive 328, or the like.

LIS 354 may search through the social network or request Social Network Manager (SNM) 356 to search through the social network for members associated with the requested location information. In one embodiment, LIS 354 may manage the location information remotely over network interface 310, by communicating with a location information service, such as GLT server 133, rating and review server 133, and sponsored search/ad server 131 of FIG. 1. LIS 354 may employ a process such as described below in conjunction with FIGS. 4 and 6 to perform at least some of its actions.

SNM 356 includes any component for managing a social network over a network. SNM 356 may be configured to create, update, search, or otherwise manage the social network over network interface unit 310. SNM 356 may employ a process such as described below in conjunction with FIGS. 4 and 6 to perform at least some of its actions.

SNM 256 may store the social network in a datastore, including hard disk drive 328, or the like. One embodiment of a representation of a social network is described in more detail in conjunction with social network 1400 of FIG. 14, table 1500 of FIG. 15 and/or table 1600 of FIG. 16, for example. Briefly, however, the social network may be stored as a graph, tree, database, or any other data structure. The members of the social network may be indexed by their unique member ID, or the like, for quick update, lookup, or the like.

The social network may also have characteristics, such as a size of a community for a particular member. The community of a member may be defined as a set of other members within a degree of separation from the member, a set of other members having a particular strength of association with the member, a maximum number of members in the community, or the like. Referring briefly to social network 1400 of FIG. 14, community of member 1401 shows an example of a community.

The social network of members may be searched for location information related to the members by a depth-first search, breadth first search, A* search, or any type of search algorithm for a graph and/or tree structure. Referring briefly to social network 1400 of FIG. 14, a depth first search of member 1401 may begin at member 1401, continue member 1402, then to member 1404, and member 1405, where a stopping condition occurs. Next, the search continues to member 1403. The depth first search may take into account already visited members, and may not continue to member 1402.

An A* search may be similar to the depth-first search, except that the stopping condition may be based on a heuristic, such as a strength of relatedness of the next member to be searched, an amount or last update of activity of the next member to be searched, or the like. In this manner, the search may focus on members with high relatedness to each other.

A breadth first search may begin at member 1401, continue to member 1402, and then continue to another member at a same degree of separation, e.g., member 1403, then continue to members of the next degree of separation, e.g., member 1404, and so forth, until a stopping condition occurs.

Although shown as a graph structure in social network 1400, the social network need not be stored in a graph structure. For example, referring briefly to table 1500 of FIG. 15, the rows of the table may represent associations between location information and members of a social network. The members indexed by member IDs 1512-1515 may be searched by searching all rows of table 1500, or all rows for members belonging to a particular community—e.g., one of communities 1532-1535. One example of a possible SQL statement for selecting location information from table 1500 that is within a proximity to GPS coordinate(s) (a,b) and based on member IDs is:

SELECT*FROM Table_1500 WHERE GPS_COORDINATE_X>(a−(search distance/X)) AND GPS_COORDINATE_X<(a+(search distance/X)) AND GPS_COORDINATE_Y>(b−(search distance/X)) and GPS_COORDINATE_Y<(b+(search distance/X)) AND MEMBER_ID IN (1401, 1402, 1403)

In this example, GPS_COORDINATE_X may represent a longitude value, and GPS_COORDINATE_Y may represent a latitude value. The "proximity to" measure is based on the parameter "search_distance," given that a 1 degree change in latitude (or longitude) is equal to X meters (e.g. 1 meter=1/x degree change). Thus, the above statement finds location information associated with GPS coordinate(s) within a "search_distance" to (a,b).

In general, it will be clear to one in the art how to readily modify the above SQL statement to find for any GPS coordinate(s) (x1, y1), another GPS coordinate(s) (x2, y2), such that a distance d between (x1, y1) and (x2, y2) is less than or equal to "search_distance." The distance d between (x1, y1) and (x2, y2) may be given by the formula:

$$d=\sqrt{(x_2-x_1)^2+(y_2-y_1)^2}$$

Other formulas may also be used to take into account the curvature of the Earth, such as the Haversine formula, or the like. Briefly, the Haversine formula operates as follows:

$R$=Earth's radius (mean radius=6,371 km)

$\Delta \text{lat}=y2-y1$ $\Delta \text{long}=x2-x1$ $a=\sin^2(\Delta \text{lat}/2)+\cos(\text{lat1})*\cos(\text{lat2})*\sin^2(\Delta \text{long}/2)$ $c=2*a \tan 2(\sqrt{a},\sqrt{(1\square a)})$ $d=R*c$ Thus, it will be clear to one in the art how to modify the above SQL statement to find, for any GPS coordinate(s) (x1, y1), another GPS coordinate(s) (x2, y2), such that a distance d between (x1, y1) and (x2, y2) is less than or equal to "search_distance," while taking into account the curvature of the Earth.

Referring back to network device 300, Route Mapper (RM) 357 may include any component for mapping a route from one geographical location to another. RM 357 may access a street map, or other topological map, stored in a datastore, including hard disk drive 328, or the like. Given a start location and an end location, RM 357 may find a route between the locations using any route mapping algorithm, including the Moore algorithm, a shortest path algorithm, lowest traffic time algorithm, Frank-Wolfe algorithm, Wardrop equilibrium algorithm, or the like. The use of these algorithms may also take into account finding a route through intermediate locations. In one embodiment, the start location, end location and/or intermediate locations may be identified by GPS coordinates. RM 357 may request from LIS 354, at least some location description, such as location names associated with a GPS coordinate of a location in the route, or the like. RM 357 may employ a process such as described below in conjunction with FIG. 5 to perform at least some of its actions.

Messenger service 352 includes any component for enabling a communication between a plurality of devices. Messenger service 352 may be configured to relay messages between two or more of client devices 101-103 of FIG. 1, for example. Messenger service 352 may relay IM, SMS, email, and/or VOIP messages, or otherwise enable a communication between the plurality of devices. In one embodiment, messenger service 352 may route messages through an intermediate messenger server, such as messenger server 132 of FIG. 1, or the like. In one embodiment, messenger service 352 may enable a communication between a member of the social network and another member of the social network associated with a GPS coordinate. Messenger service 352 may employ a process such as described below in conjunction with FIG. 7 to perform at least some of its actions.

Although LIS 354, SNM 356 and RM 357, are described as operating on GPS coordinates, in an alternate embodiment, these components can be modified to operate substantially similarly with any geographical coordinates using any of a variety of other mechanisms without departing from the scope of the invention. For example, LIS 354 may geographical coordinates, and SNM 356 may manage the geographical coordinates in the social network, and RM 357 may manage routes between and/or through at least some points associated with the geographical coordinates.

Generalized Operation

Figure 4:
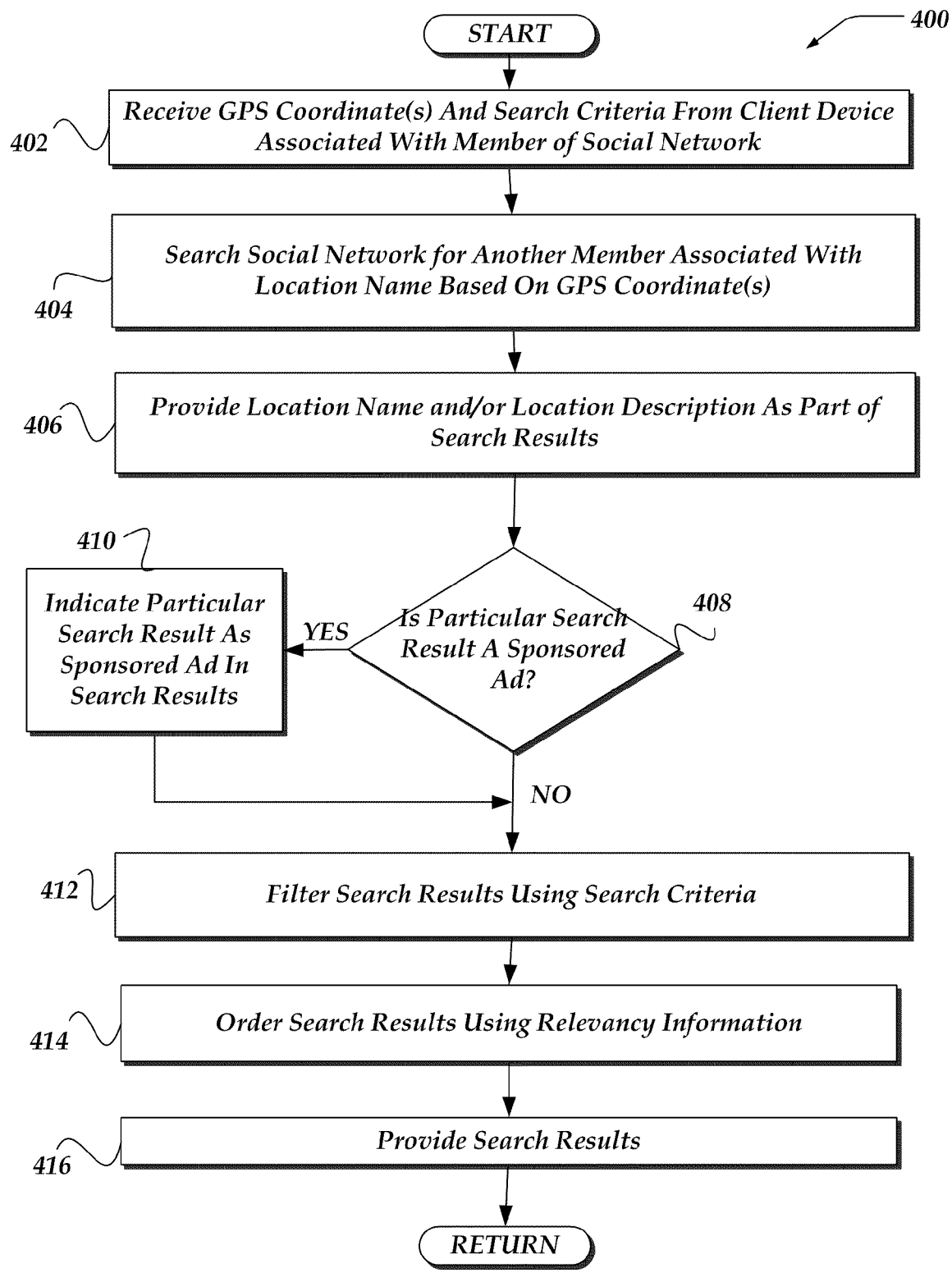
FIG. 4 illustrates a logical flow diagram generally showing one embodiment of searching the social network for location information.

The operation of certain aspects of the invention will now be described with respect to FIGS. 4-7. FIG. 4 illustrates a logical flow diagram generally showing one embodiment of providing location information based in part on a social network. Process 400 of FIG. 4 may be implemented within GSS 106, GLT Server 134, rating and review server 133, messenger server 132, and/or sponsored search/ad server 131 of FIG. 1.

Process 400 of FIG. 4 begins at block 402, where a GPS coordinate is received from a client device associated with a member of a social network. In one embodiment, the GPS coordinate may identify a geographical location of the client device. In one embodiment, the client device may be a mobile device, such as mobile devices 102-103 of FIG. 1, or the like. In one embodiment, search criteria/criterion may also be received from the client device. In one embodiment, information about or identifying the member may be received with the GPS coordinate/search criteria, or may have been sent earlier by the client device (e.g., in a login-process), may be associated with the client device (by way of the client device's MAC address, IP address, or other address), or the like. In another embodiment, the GPS coordinate, search criteria, and/or information about or identifying the member may be received from another process or device.

Processing next continues to block 404, where the social network is searched for another member associated with a location name based on the GPS coordinate and/or the search criteria. The search of the social network may begin at the member. In one embodiment, the search may be a breadth-first search, depth-first search, A* search, or the like, from the member to other related members of the social network, as described above in conjunction with FIG. 3. The search may continue until at least one member associated with a location name is found, a pre-defined number of members associated with location names are found, a depth of the search has been reached, or some other search stopping criteria has been reached.

In one embodiment, the other member is found if a previously stored GPS coordinate associated with the location name and with the other member is within a proximity to the GPS coordinate received from the client device. In one embodiment, the search distance defining the proximity may be provided in the search criteria. The location name and the GPS coordinate may be directly associated (linked in the social network) with the other member or may be associated with a community of the other member. Referring briefly to social network 1400, the search may begin with member 1401. If the GPS coordinate provided by the client device is within a proximity to GPS coordinate 1440, then member 1401 is found, and location names 1450-1451 are provided for further processing. Alternatively, if the GPS coordinate provided by the client device is within a proximity to GPS coordinate 1441, then location name 1452 associated with the community of member 1401 (and thus associated with member 1401) is provided for further processing.

In one embodiment, besides being based on the GPS coordinate received from the client device, the search may also be based on a local time. In this embodiment, the local time is determined based on the GPS coordinate and on a time of receiving the GPS coordinate and/or the search criteria. In one embodiment, the local time may be determined from a GPS coordinate based on a Universal Coordinate Time (UTC) or other global time measure, and taking into account the local time zone of the GPS coordinate. In another embodiment, the global time measure may be received from a GPS source (e.g., the source for the GPS coordinate). In another embodiment, the local time may be a day of the week, a day of the month, a holiday, or the like, based on the GPS determined local time. For example, a member A may have entered a location name "Restaurant" for a GPS coordinate at a local time of 17:00 when member A was at or near the restaurant. The local time is also associated with the location name, the GPS coordinate, and with the member A in the social network. If, member B searches for any location at or near the GPS coordinate and at time 17:30, then the location name "Restaurant" may be returned because the time 17:30 is within a range of time 17:00. In any case, if the local time is within a range of a time associated with the location name, then the location name is provided for further processing. The range may be determined by an administrator as a set of time values representing temporal closeness, by the searching member, or the like.

In an alternate embodiment, at block 404 of FIG. 4, an optional search may be performed on a default/pre-populated database of geographical information database, or the like. In one embodiment, the database may be searched if location names are not found in the social network. In another embodiment, location information from the database may augment the location information found in the social network. In any case, the GPS coordinate provided by the client device may be matched against GPS coordinates in the database, based on any variety of database searches, including b-tree searches, linear searches, or the like. The location names and/or other location information found in the database may also be provided for further processing.

Processing next continues to block 406, where each found location names is included as a search result in a plurality of search results. A search result may be a record, object, or any other data structure. In one embodiment, one or more location descriptions associated with the appropriate found location name may also be included in a search result. Location descriptions include a tag, remark, comment, local time, rating, the GPS coordinate, or the like. An example search result may include location name 1451 of social network 1400 of FIG. 14, for example. Location description 1470-1472 may also be included in the same search result as location name 1451. In general, the search results may be stored in any format configured for retrieval, ordering, filtering, and searching.

Figure 12:
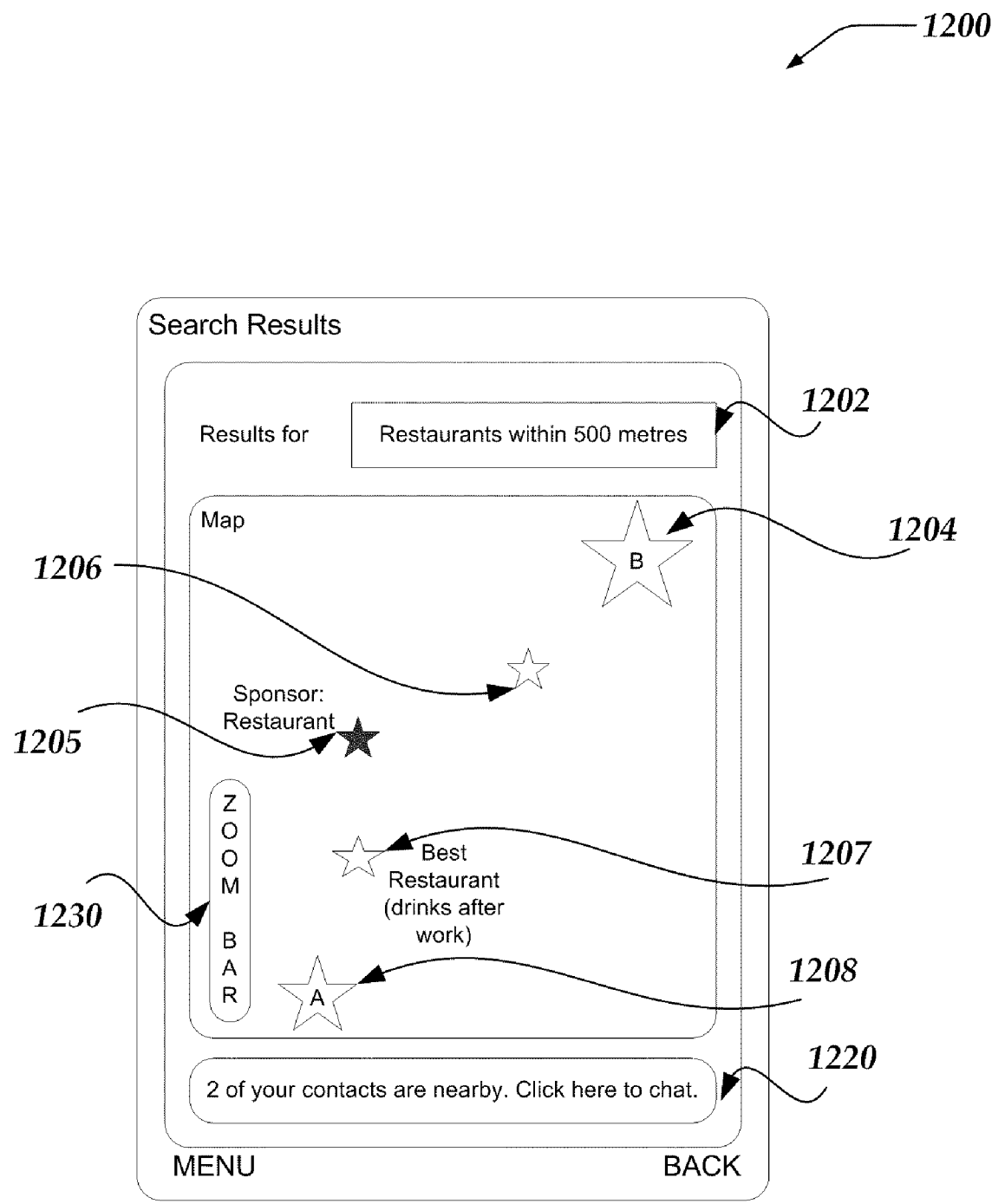
FIG. 12 shows one embodiment of a display for providing search results of a search of the social network for location information.
Figure 13:
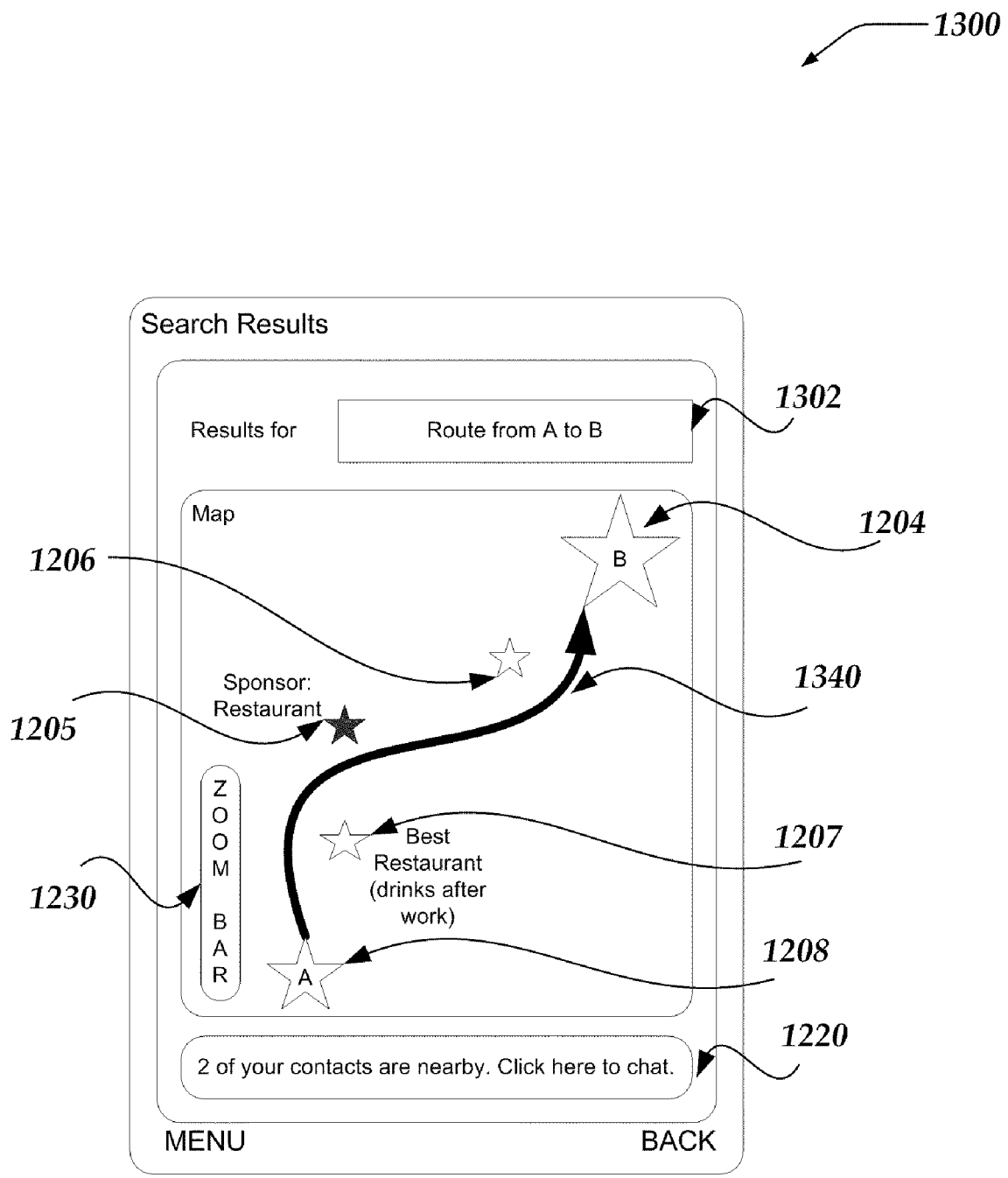
FIG. 13 shows another embodiment of a display for providing search results of a search of the social network for a route.

In one embodiment, the plurality of search results may comprise a list, a two dimensional array of points (e.g., representations of locations) corresponding the GPS coordinates of the location names in the search result or the like. Display 1200 of FIG. 12, and display 1300 of FIG. 13 show examples of a display of the two dimensional array. In another embodiment, the plurality of search result may be stored and/or represented in more than two dimension, wherein the other dimensions greater than the second dimension may represent a relevancy of the location name, time for which the location name is relevant, a depth or height of a landmark identified by the location name, or the like.

Processing next continues to decision block 408, where it is determined if a search result (record) in the plurality of search results is a sponsored advertisement. A sponsored advertisement includes any location information (e.g., included in a search result record) for which any member of the social network, or any third-party has paid for the location description to be included in the plurality of search results. In one embodiment, the other member/third-party may purchase an association between the location information and the GPS coordinate a set of search words, or the like. Thus, in one embodiment, a payment may be received from the other member for associating another GPS coordinate with the location name in the social network, wherein the other GPS coordinate is within a proximity to the GPS coordinate. If it is determined that the location information/search result is a sponsored advertisement, processing continues to block 410. Otherwise, processing continues to block 412.

At block 410, the search result (e.g., the location name or other location information associated with the search result) is indicated as a sponsored advertisement within the plurality of search results. In one embodiment, a field associated with the search result may be marked as a sponsored advertisement and/or the field may be used to display the search result as a sponsored advertisement. For example, display 1200 of FIG. 12 may show point 1205 in a different color, shape, size, or the like, to indicate point 1205 as a sponsored advertisement. Processing then continues to block 412.

At block 412, the plurality of search results are filtered based on the search criteria received from the client device and/or based on information about the social network. In one embodiment, the search criteria may include a query string, a search distance, a search time, a rating level, a community filter for the social network, or a time of last update of the location information (e.g., information updated within a recent time period, e.g., last 'N' days). An example of search criteria may include a distance from 'here' (e.g., where I am currently located), tag (e.g., "great restaurant" or "cinema"), time (e.g., 1 hour from now), and rating (e.g., 4 stars), or the like. The "where I am" criterion and time information can be based on the GPS coordinates sent from the client device.

In any case, each one of the search criteria may be associated with a type of location information. Accordingly, based on the type of the location information (e.g., string type, time type, rating type, location type (GPS coordinate)), the appropriate search criterion is matched against the particular location information. If a search result in the plurality of search results fails to match at least one of the search criteria, then the search result is filtered out of the plurality of search results. In one embodiment, the search result may also be filtered out unless it matches all of the search criteria.

For a string-typed search criterion, the search criterion may match location information (e.g., location description or location name) in a particular search result if at least a portion of a string of the location information matches the search criterion. The match may be based on any string-based search techniques, such as a regular expression match, a partial string match, a fuzzy string match, information retrieval searching, latent semantic indexing, or the like. These string based search criterion may include a search query, a Boolean query, a search string, a word, a set of words, a time range, a rating range, or the like. Searching may also involve removing stop words, stemming of strings, performing an inverse index lookup of the word, performing a Boolean match, or the like. Referring briefly to FIG. 15, the search criteria including the query string "restaurants" may match the row identified by record ID 1452, based on a stemming of the word "restaurants" to "restaurant" and based on a partial/substring match of the string "Best Restaurant."

For non-string based criteria, an appropriate type-based matching may be performed (e.g., a matching of a time within a range of times, a matching of a rating within a range of ratings, or the like). For time-matching, the range may be determined by an administrator as a set of time values representing temporal closeness, by the searching member, or the like. Referring briefly to FIG. 15, a search criterion including the time 16:00 may match the row identified by record ID 1452 because the time 16:00 may be within a (close) range of time 1554 (16:30).

In one embodiment, the search criteria may include a community filter for the social network, and accordingly, filtering may be based on this information about the social network. The community filter may be a degree of separation between members of the social network, or any other information about a community of the member. The community of a member may be defined by for example, an administrator, the member, or the like, in a variety of ways. The community of a member may be defined as a set of other members within a degree of separation of the member, a set of other members having strength of association with the member, a maximum number of members in the community, or the like. In one embodiment, a search result associated with members who are outside the community may be filtered out. Referring briefly to FIG. 15, the search criteria may include the community filter (1401, 1402, 1403)—e.g., the community of member 1401. The search criteria may match the rows identified by record IDs 1561-1563, and may filter out any rows with member IDs not in (1401, 1402, 1403).

Figure 14:
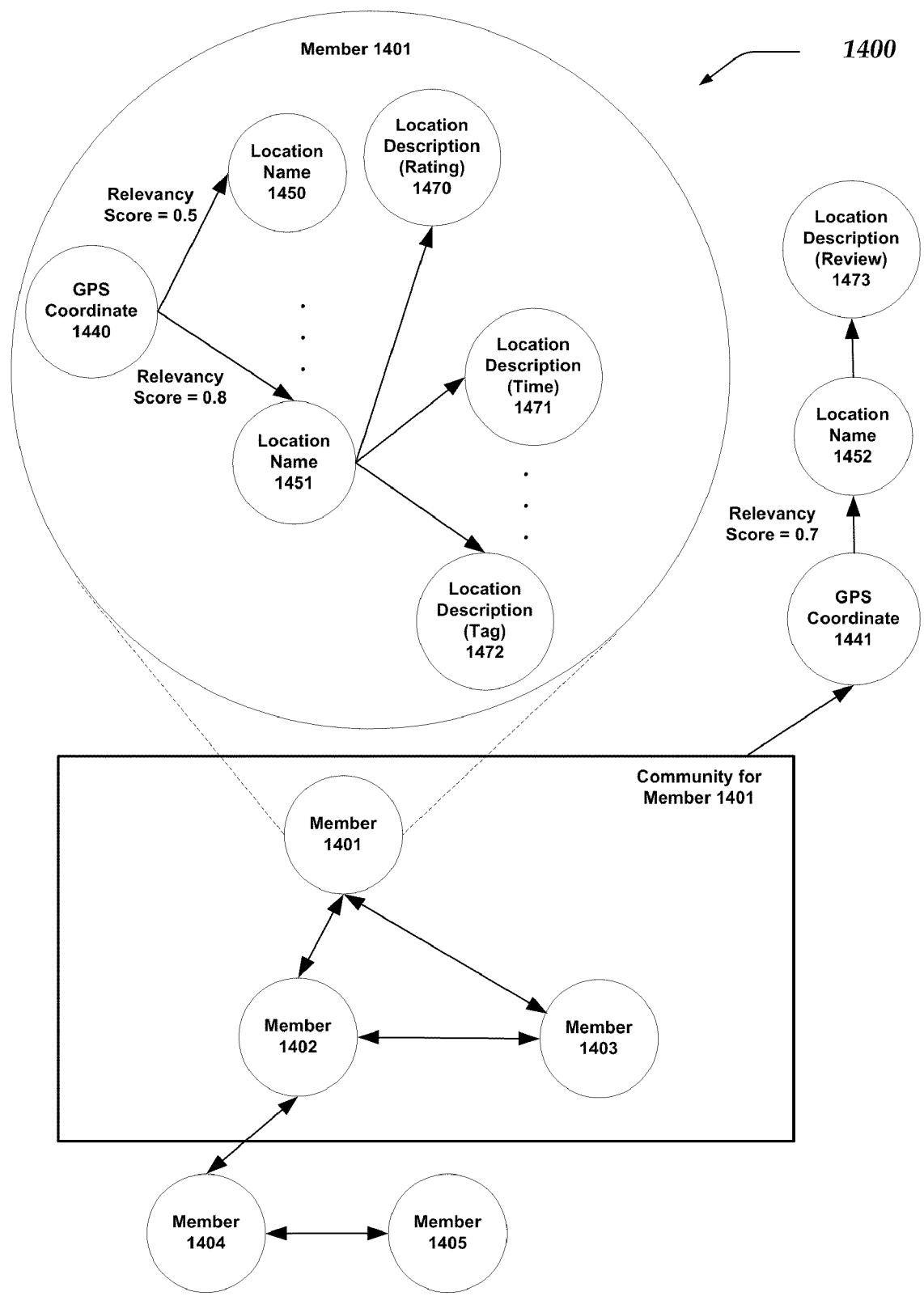
FIG. 14 shows an example of a social network with a detailed view of location information associated with a member of the social network.

In another embodiment, a first member with a same or lower degree of separation than the degree of separation defined in a community filter may be selected to remain in the search result, while other members with a higher degree of separation may be filtered out. Referring briefly to FIG. 14, members 1402-1403 may be included in the community of member 1401, but members 1404-1405 may be filtered out because they are more degrees of separation form member 1401 than members 1404-1405.

Referring back to process 400, processing next continues to block 414, where the search results are ordered based on relevancy information of a search result included in the plurality of search results. In one embodiment, relevancy information may include a degree of separation between the member and the other members associated with search results, an amount of match of the search criteria, a relevancy score, a status of the search result (e.g., as a sponsored advertisement), an origin of the search result (e.g., from the social network or from a default database), a rating associated with the search result (e.g., where a location description in the search result is a rating), or virtually any other relevancy information.

In one embodiment, the search result with a greater amount of match may be ordered higher in the search results (e.g., ordered before another search result, indicated as larger on a N dimensional map, or the like). Referring briefly to FIG. 15, search criteria including the query string "store" and a time 12:00 may match the rows identified by record IDs 1561-1562 because the query string "store" matches and the time 12:00 partially matches the rows. In this example, the row identified by record ID 1562 would be ordered higher in the plurality of search results because the search criteria matches both the location name and time for record ID 1562, but only matches the location name for record ID 1561.

In another embodiment, the relevancy information may include social network information. In this embodiment, a first search result associated with a first member of the social network may be ordered higher in the search results than a second search result associated with a second member, if the first member has a lower degree of separation from the member associated with the client device than the second member. Referring briefly to FIG. 14, for a search by member 1401, a search result including information provided by member 1401 (e.g., location names 1450-1451) may be ordered higher than other search results.

In yet another embodiment, a relevancy score may be associated with at least one of location information in a search result. The relevancy score may be used (alone or in combination with other relevancy information) to order the search results. Referring briefly to FIG. 15, search results may include the rows identified by record IDs 1561-1562. The row identified by record ID 1562 may be ordered higher in the search results because it has a higher relevancy score 1543 (0.8) than relevancy score 1542 (0.5). In one embodiment, relevancy scores may be determined by a block 608 of FIG. 6.

In an alternate embodiment, the ordering may be based on a combination of the relevancy information described above, or any other relevancy information. In one embodiment, the relevancy information may be the amount of match multiplied by an inverse of the degree of separation, or the like.

Processing next continues to block 416, where the search results are provided to the client device, a calling process, or another process or device. In one embodiment, the search result may be provided as a list (e.g., text, XML, or the like), an HTML page, an image, over a network, or the like. Display 1200 of FIG. 12 shows an example of the provided search results.

In one embodiment, the search results may be pushed to the client device (e.g., as an alert providing the search results, or the like). In another embodiment, the client device may pull (through a HTTP request, or the like), the search results (e.g., as a map that includes the location description of each of the search results). In one embodiment, the member associated with the client device may specify a preference for delivery of search results (e.g., as pushed or pulled search results). In one embodiment, the preference may specify a time of day (range) when the search results may be pushed/pulled, a geographical location (range) for which the search results may be pushed/pulled or the like. In one embodiment, the preference may even specify that sponsored advertisements may be blocked/filtered, from the member. In another embodiment, the preference may be based on an aggregate of preferences of members of a community. Processing then returns to calling process for further processing.

In an alternate embodiment, blocks 412 and 414 may be optional and might not be performed. In another alternate embodiment, blocks 404, 412, and/or 414 may occur concurrently. In this embodiment, appropriate location names and/or tags may be selected, filtered, and/or ordered while the social network is being searched for members associated with the location names. The plurality of search results may be modified based in part on a match of at least one search result of the plurality of search results with a search criteria received form the client device, and further based on relevancy information associated with the at least one search result.

Figure 5:
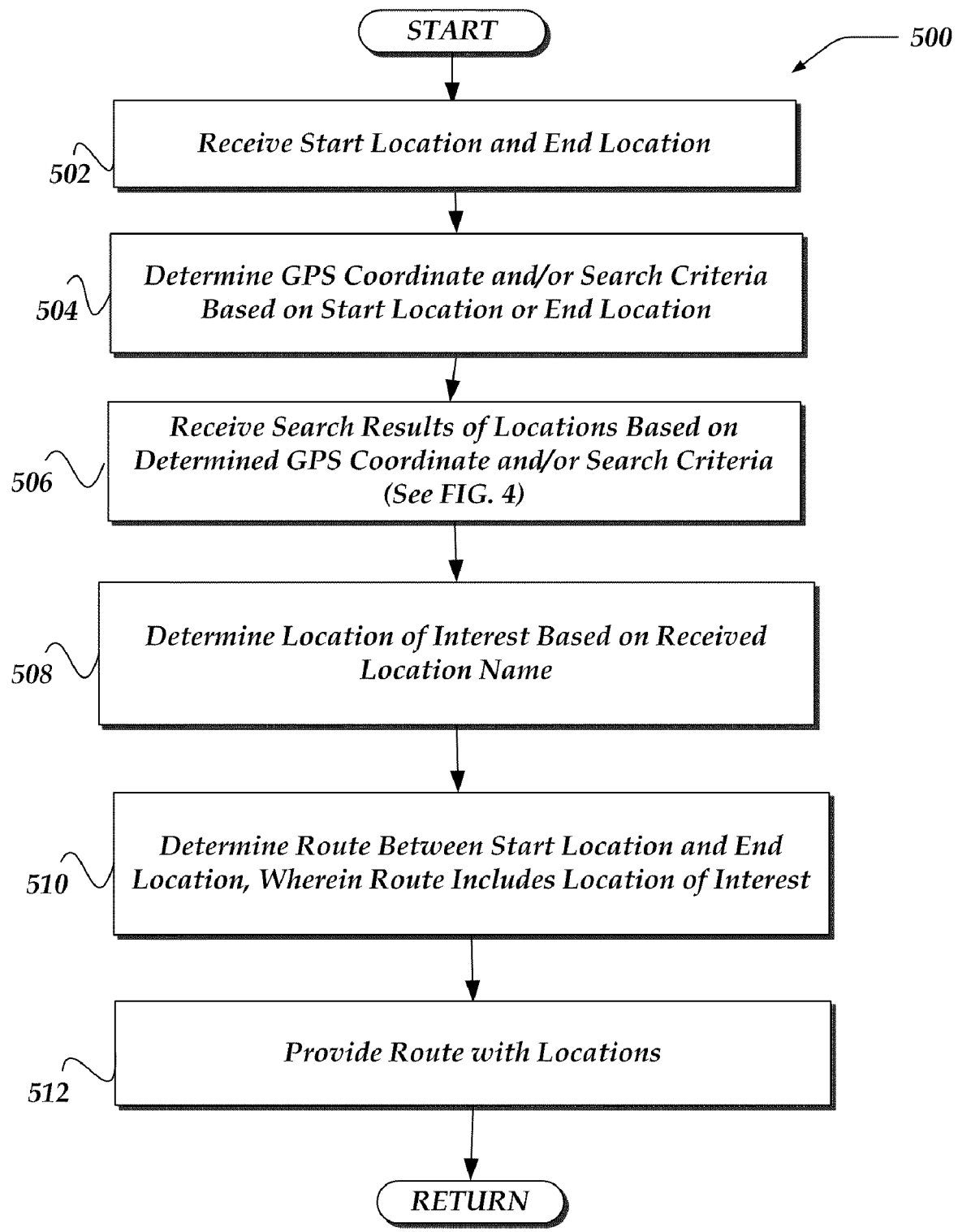
FIG. 5 illustrates a logical flow diagram generally showing one embodiment of providing a route based, in part, on the social network.

FIG. 5 illustrates a logical flow diagram generally showing one embodiment of providing a route based in part on a social network. Process 500 of FIG. 5 may be implemented within GSS 106, GLT Server 134, rating and review server 133, messenger server 132, and/or sponsored search/ad server 131 of FIG. 1.

Process 500 of FIG. 5 begins at block 502, where at least one of a start location and an end location for a route are received from a client device, over a network, or the like. The at least one locations may be received from a member of a social network using the client device. The at least one locations may include any location information, including a GPS coordinate, a location name, or the like. In one embodiment, both the start location and end location are received from the client device.

In another embodiment, only one of the start location or end location is received, and the other location is determined based on an identity of the member in the social network. For example, the other location may be based on interests of the member or community of the member. In this embodiment, the other location may be a frequently searched location, a highly rated location for the member/community, or the like. In one embodiment, the other location may be within a proximity to a GPS coordinate associated with the client device. A time associated with the other location may also be within a (close) range of a current local time associated with the client device, or the like. The other location may also be a sponsored advertisement. In an alternative embodiment, block 502 may be optional, and both the start location and end location may be determined based on an interest of the member or the community.

Processing next continues to block 504, where a GPS coordinate and/or search criteria associated with either the start location and/or end location is determined. In one embodiment, the GPS coordinate and/or the search criteria may be provided by the client device. Alternatively, the GPS coordinate may be retrieved from the social network—e.g., the GPS coordinate is associated with a location of interest of the member or the community of the member. In another embodiment, the GPS coordinate may be a point (e.g. a midway point) between a first GPS coordinate associated with the start location and an end GPS coordinate associated with the end location. Also in an alternate embodiment, the search criteria may be determined based on at least a part of a location description (e.g., a local time, a tag, or the like) associated with the start and/or end location. For example, the search criteria may include the query string "music" if the start and/or end location are associated with the location description "music store." Accordingly, the search criteria and GPS coordinate may define a search of similar locations within a proximity to the particular location.

Processing next continues to block 506, where a plurality of search results including other locations (e.g., location information, location names, or the like) are received based on the GPS coordinate, a search criterion/criteria and/or information about the member associated with the client device. In one embodiment, the social network is searched for another member and a location of interest based on the GPS coordinate and the search criterion/criteria, wherein the location of interest has been identified, in the social network as relevant to the other member. In one embodiment, the searching may be performed by process 400 of FIG. 4 and/or signal flow 800 of FIG. 8.

Processing next continues to block 508, where a search result/location included in the plurality of search results may be used to determine at least one location of interest. In one embodiment, the location of interest may include the start location or the end location (e.g., there are no other locations in the route between the start location and end location). In one embodiment, each search result of the plurality of search results may be a location of interest. In one embodiment, the geographically closest location may be determined to be the location of interest. In another embodiment, the search result ordered the highest in the plurality of search results may be determined as the location of interest.

Processing next continues to block 510, where a route is determined between the start location and the end location, and wherein the route includes at least one location of interest (e.g., the route is though the at least one location of interest). The route between the locations may be determined using any route mapping algorithm, including those discussed above.

Processing next continues to block 512, where the route is provided to the client device. In one embodiment, the route may be included in the search results and provided to the client device. For example, the route may be over-laid on an HTML, image, or other version of the search results, or the like. In another embodiment, the route may be included in a separate field in the search result. In any case, the modified search result including the route is provided to client device or another process or device. In one embodiment, the modified search results are pushed to or pulled from the client device substantially similar to the process described in block 416 of FIG. 4. Display 1300 of FIG. 13 shows an example of the provided modified search results including the route. Processing then returns to calling process for further processing.

As an example of process 500, a member searches for a route from A to B at or around 10 A.M., local time by, for example, sending entering a GPS coordinate associated with the member's client device as point A, and another GPS coordinate as point B. If the changing of the guards at Buckingham palace is near the route from A to B at or near 10 A.M, then the route presented may include the location of the changing of the guards as a location of interest along the path from A to B. If however the member is traveling at 12 A.M., and the changing of the guards does not happen at that time, then this location of interest may not be included in the route from A to B.

Figure 6:
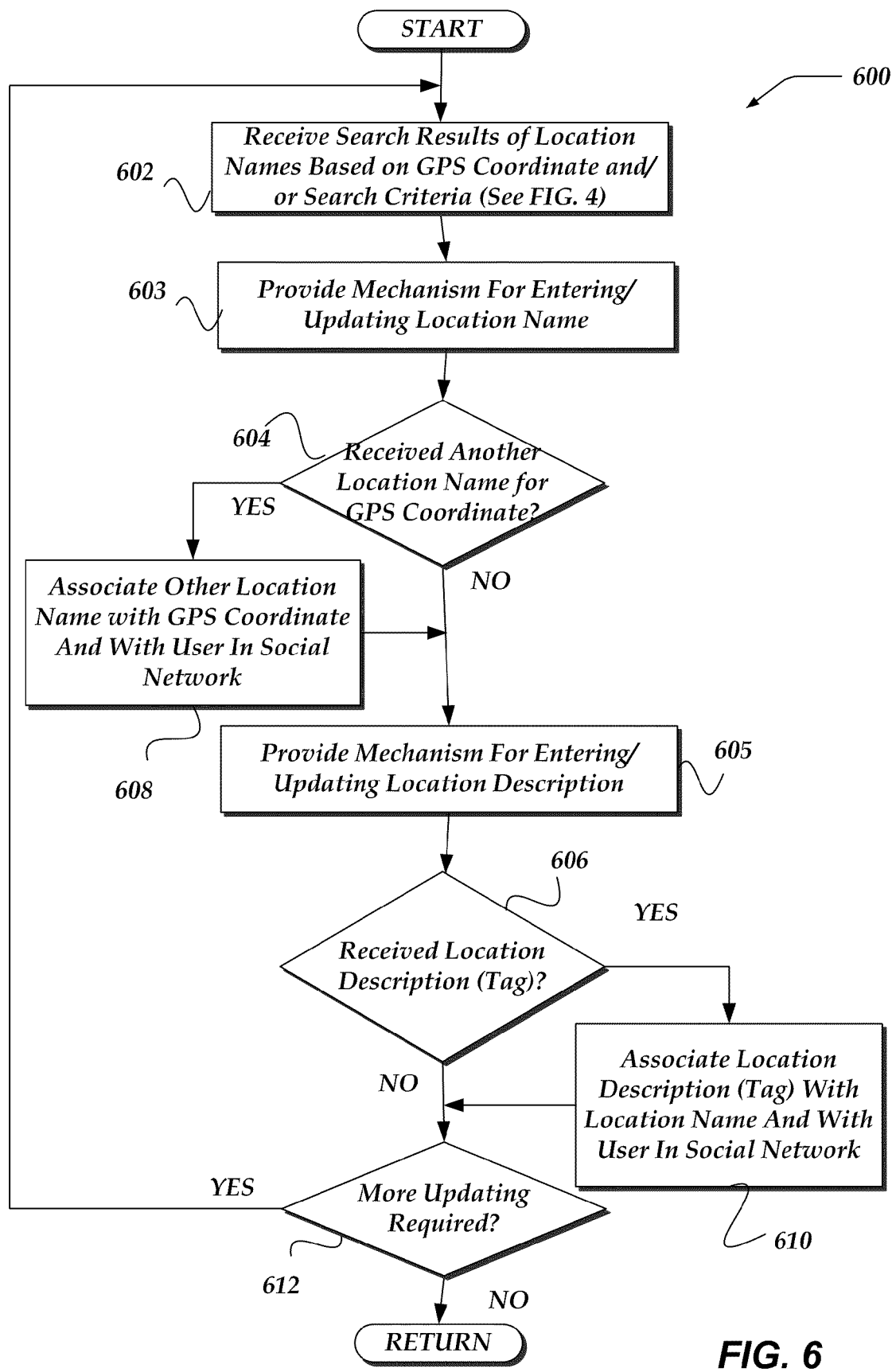
FIG. 6 illustrates a logical flow diagram generally showing one embodiment of entering/updating location information associated with a member in the social network.

FIG. 6 illustrates a logical flow diagram generally showing one embodiment of entering/updating location description associated with members in a social network. Process 600 of FIG. 6 may be implemented within GSS 106, GLT Server 134, rating and review server 133, messenger server 132, and/or sponsored search/ad server 131 of FIG. 1.

Process 600 of FIG. 6 begins at block 602, where search results of location names and/or location descriptions are received based on a GPS coordinate and/or a search criterion/criteria. In one embodiment, the search results may be requested by a member of a social network through a client device, and the GPS coordinate may be associated with a geographical location of the client device. In one embodiment, a request for location information in the social network associated with the GPS coordinate may be received from the client device associated with the member of the social network. In response to the request for the location information, a location name associated with another member of a social network based on the GPS coordinate may be provided to the client device. In one embodiment, the searching/requesting/providing may be performed by process 400 of FIG. 4 and/or signal flow 800 of FIG. 8.

Processing next continues to block 603, where the client device may be provided with a mechanism for updating and/or entering another location name associated with the GPS coordinate. In one embodiment, the mechanism may be an entry box for entering and/or updating the text of the location name. In another embodiment, the mechanism may provide a selection list of possible location names based on a history of location names entered at a location within a proximity to the GPS coordinate, and/or at a time within a (close) range to a local time associated with the GPS coordinate. The member may select one of the location names in the list.

Figure 10:
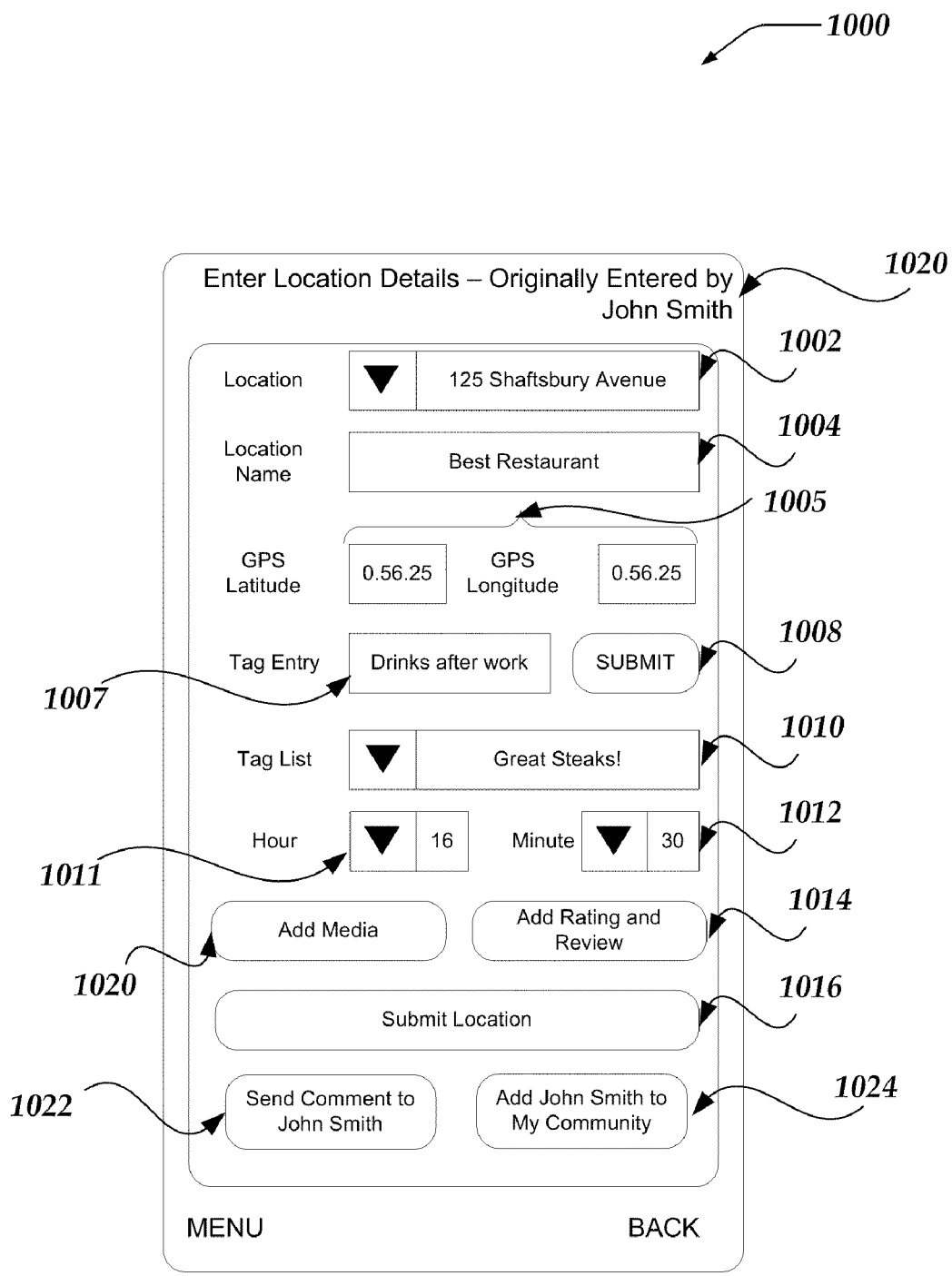
FIG. 10 shows one embodiment of a display for entering/updating location information associated with a member in the social network

Processing next continues to decision block 604, where it is determined if another location name associated with the GPS coordinate is received from the client device. Display 1000 of FIG. 10 is an example of a possible display used by the client device to enable the member to enter the other location name associated with the GPS coordinate. If it is determined that the other location name is received, then processing continues to block 608. Otherwise, processing continues to block 606.

At block 608, the other location name may be associated with the GPS coordinate and/or with the member in the social network. In another embodiment, instead of being associated with the GPS coordinate received from the client device, the other location name may be associated with another GPS coordinate originally associated with the location name provided in the search results at block 602. Alternately, the location name may be associated with an intermediate GPS coordinate between the received GPS coordinate and the other GPS coordinate.

In any case, the location name may be canonicalized (e.g., capitalized, stemmed, transcoded), or otherwise pre-processed to covert the location name into a standardized format. In one embodiment, if a previously stored location name associated with the GPS coordinate is substantially similar to the other location name (e.g., based on partial string match, removing stop words, stemming the words, or the like), the other location name may be changed to be previously stored location name. For example, given the other location name "The Best Restaurant" and the other previously stored location name "BEST RESTAURANT," the other location name may be canonicalized into "BEST RESTAURANT."

In one embodiment, at block 608, a local time (e.g., a type of location description) may also be associated with the other location name in the social network. The local time may be determined based on the GPS coordinate and on a time of receiving the other location name. In this embodiment, the current time of the server is translated into a local time of the client device based on a time zone associated with the GPS coordinate. For example, in social network 1400, location description 1471 may be a time at or near the time that location name 1451 was received from member 1401.

In any case, the other location name and/or determined local time are updated (e.g., associated with the member and the GPS coordinate) in the social network to enable further searching of the social network for the other location name, to enable another request for location information associated with the GPS coordinate to return at least the location name and the other location name, or the like. The other location name and/or determined local time may be updated in, for example, a social network data structure such as social network 1400 of FIG. 14, or a database table such as tables 1500 and 1600 of FIGS. 15 and 16 respectively.

In one embodiment, a relevancy score may be updated for an association between the other location name and a GPS coordinate. The update may occur for the member and/or a community of the member. For example, in social network 1400 of FIG. 14, relevancy scores for associations between GPS coordinate 1440 and location names 1450-1451 represent how closely GPS coordinate 1440 is identified by location names 1450-1451 for member 1401 and/or community for member 1401. As shown, the association between location name 1451 and GPS coordinate 1440 is more relevant for member 1401.

In any case, in one embodiment, the relevancy score for the association between the other location name and the GPS coordinate for the member may be increased based on a frequency of receiving the other location name, wherein the increased relevancy score is configured to be used in part to order search results of location names. Accordingly, as more members of a community associate a particular location name with the GPS coordinate, the relevancy score may become higher. The relevancy score may be used by process 400 of FIG. 4 and/or signal flow 800 of FIG. 8, to, in part, order or filter a search result.

Referring back to process 600, processing next continues to block 605, where the member may be provided with a mechanism for updating and/or entering tag, rating, comment, local time, or other location description associated with the (other) location name. In one embodiment, the mechanism may be an entry box for entering and/or updating the text of the location description (e.g., tag, rating, or the like). In another embodiment, the mechanism may provide a selection list of possible location description based on a history of location description entered at a location within a proximity to the GPS coordinate and/or at a time within a (close) range to a local time associated with the GPS coordinate. The member may select one of the location descriptions in the list. In one embodiment, the mechanism for entering the other location name of block 603 and the mechanism for entering the location description may be the same mechanism. Display 100 of FIG. 10 shows one embodiment of a display for entering/updating location description associated with members in a social network.

Processing next continues to decision block 606, where it is determined if the location description is received from the client device. In one embodiment, the location description and/or the other location name from block 602 may be received concurrently. If it is determined that the location description is received, then processing continues to block 610. Otherwise, processing continues to decision block 612.

At block 610, the location description may be associated with the original location name received as part of the search results of block 602 and/or with the other location name received from block 608. In one embodiment, the location description may be associated to enable another searching of the social network based on or using the location description, or the like. The location description may also be associated with the member or a community of the member in the social network. In one embodiment, the location name maybe canonicalized, substantially similar to the process of block 608. As an example, social network 1400 of FIG. 14 shows location description 1470-1472 associated with location name 1451. Location description 1470-1472 may have been entered/updated by member 1401.

In one embodiment, the location description may be a local time determined locally by the client device (via an internal clock, or the like), and sent to a server for updating/entering. In an alternate embodiment, the other location description may be a comment. The comment may be about a location name entered by the member and may be sent to the other member. The comment may be sent to the other member over the other member's preferred mode of communication (e.g., IM, SMS, email, web-post, blogging, or the like).

Processing next continues to decision block 612, where it is determined whether more updating/entering of location names or location description is required. In one embodiment, the member, using the client device, may continue to request more search results. In another embodiment, other members, using other client devices, may request more search results. In any case, subsequent searches are refined to take into account the entered location name and location description. If it is determined that more updating is required, then processing loops back to block 602. Otherwise, processing returns to a calling process for further processing.

Although process 600 is described as associating location information (e.g., location name and location description) with the member, process 600 may be modified to associate the location information with other members, a community, or even all member of the social network, without departing from the scope of the invention. In one embodiment, the location information may be associated with the other member, e.g., an originating member who originally entered the location name provided in the search results at block 602. In another embodiment, the location information may be also associated with a community. The community may include both the member and the other member. For example, referring to FIG. 14, GPS coordinate 1441, location name 1452, and location description 1473 may be originally associated with member 1402. Member 1401 may also associate location description 1473 with GPS coordinate 1441. As a result, GPS coordinate 1441, location name 1452, and location description 1473 may be changed to be associated with all members of the community of member 1401.

Figure 7:
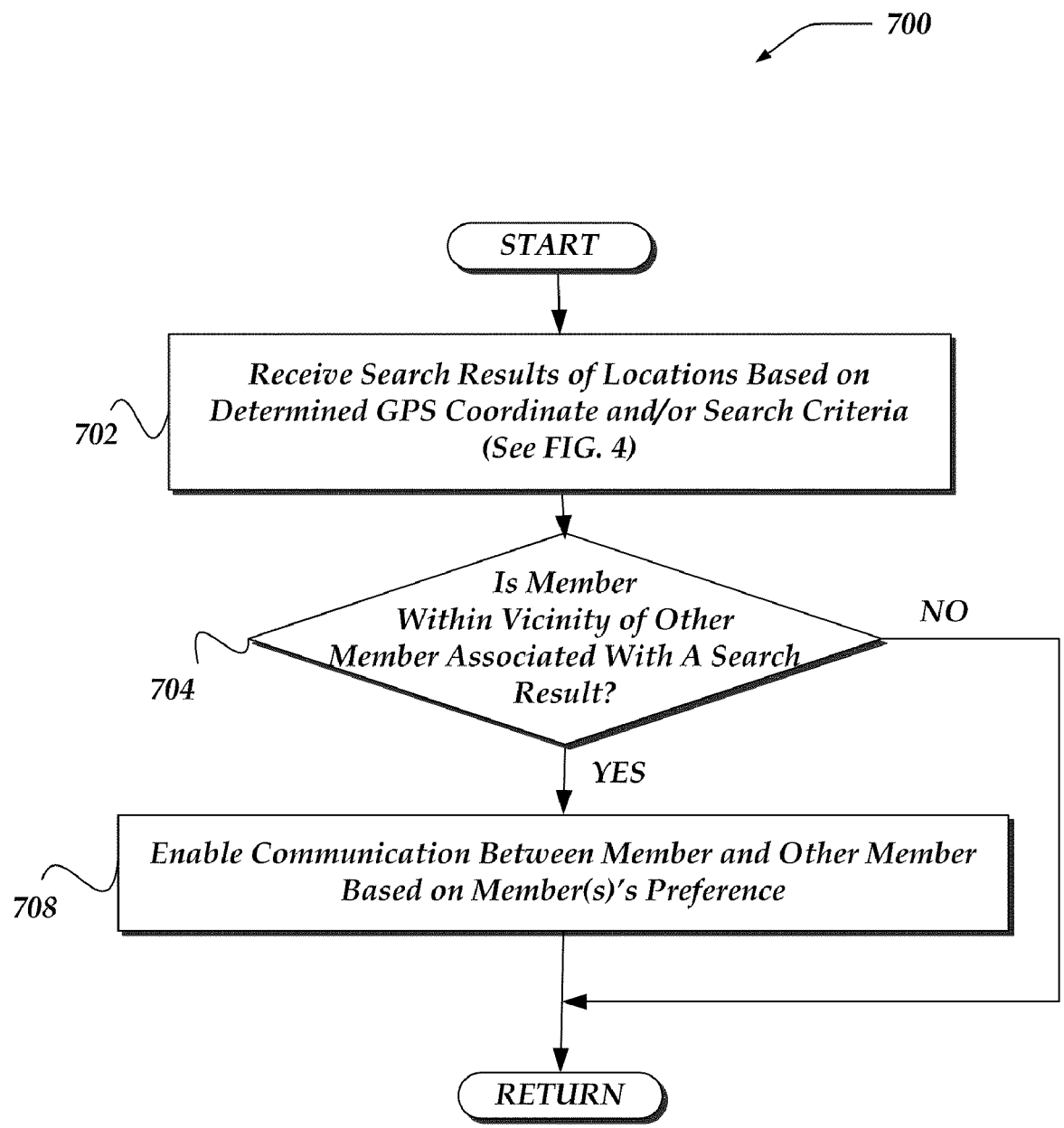
FIG. 7 shows one embodiment of enabling communication between members of the social network who have provided location information.

FIG. 7 shows one embodiment of enabling communication between members of a social network who have provided location description. Process 700 of FIG. 7 may be implemented within GSS 106, GLT Server 134, rating and review server 133, messenger server 132, and/or sponsored search/ad server 131 of FIG. 1.

Process 700 of FIG. 7 begins at block 702, where a search result including a location name and/or other location information is received based on a GPS coordinate and/or search criteria. In one embodiment, the search result may be requested by a member of a social network through a client device, and the location name may be associated with another member of the social network. The GPS coordinate may be received from the client device. In one embodiment, the searching may be performed by process 400 of FIG. 4 and/or signal flow 800 of FIG. 8.

Processing next continues to decision block 704, where it is determined if the member is within a proximity to the other member. In one embodiment, the GPS coordinate may be used to determine the geographical location of the member. In one embodiment, another GPS coordinate of the other member may be received from another client device of the other member. In yet another embodiment, a geographical location of the other member may be stored in a database, or other datastore, determined based on a MAC address or an IP address of a client device of the other member, or the like. In any case, based on a distance between the geographical location of the members, it is determined whether the members are within a proximity to each other. If the members are within a proximity to each other, then processing continues to block 708. Otherwise, processing returns to a calling process for further processing.

Processing next continues to decision block 708, where a communication is enabled between the member and the other member. In one embodiment, the communication may be based on the preference(s) of either or both the member and the other member. The preference(s) may include, a particular mode of communication, a geographical area or time of day to receive the information, a minimal degree of separation between the members before communication is enabled, a block list of members for whom no communication is allowed, whether communication should be enabled at all (e.g., a complete block of communication), or the like. The communication may be any form of communication, including an IM, SMS, email, web-post, blogging, or the like. In one embodiment, the members may also be enabled to provide their geographical locations to each other as part of the communication. In another embodiment, the geographical locations may be provided before the communication is enabled. In an alternate embodiment, the communication is enabled between the member and a plurality of other members (associated with search results) based on whether the other members are within a proximity to the member.

As one example of a use case of process 700, a member arrives in a city and performs a GPS coordinate search of the area that he/she is currently in. If there is another member currently active in the search area who has entered at least one of the search results of the search, the member can chat with the other member(s). Either member could opt-in to receive messages. The geographical location of the members can be hidden from each other, until after the chatting begins and/or the members decide to reveal their actual physical location to each other.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

Illustrative Signal Flow

Figure 8:
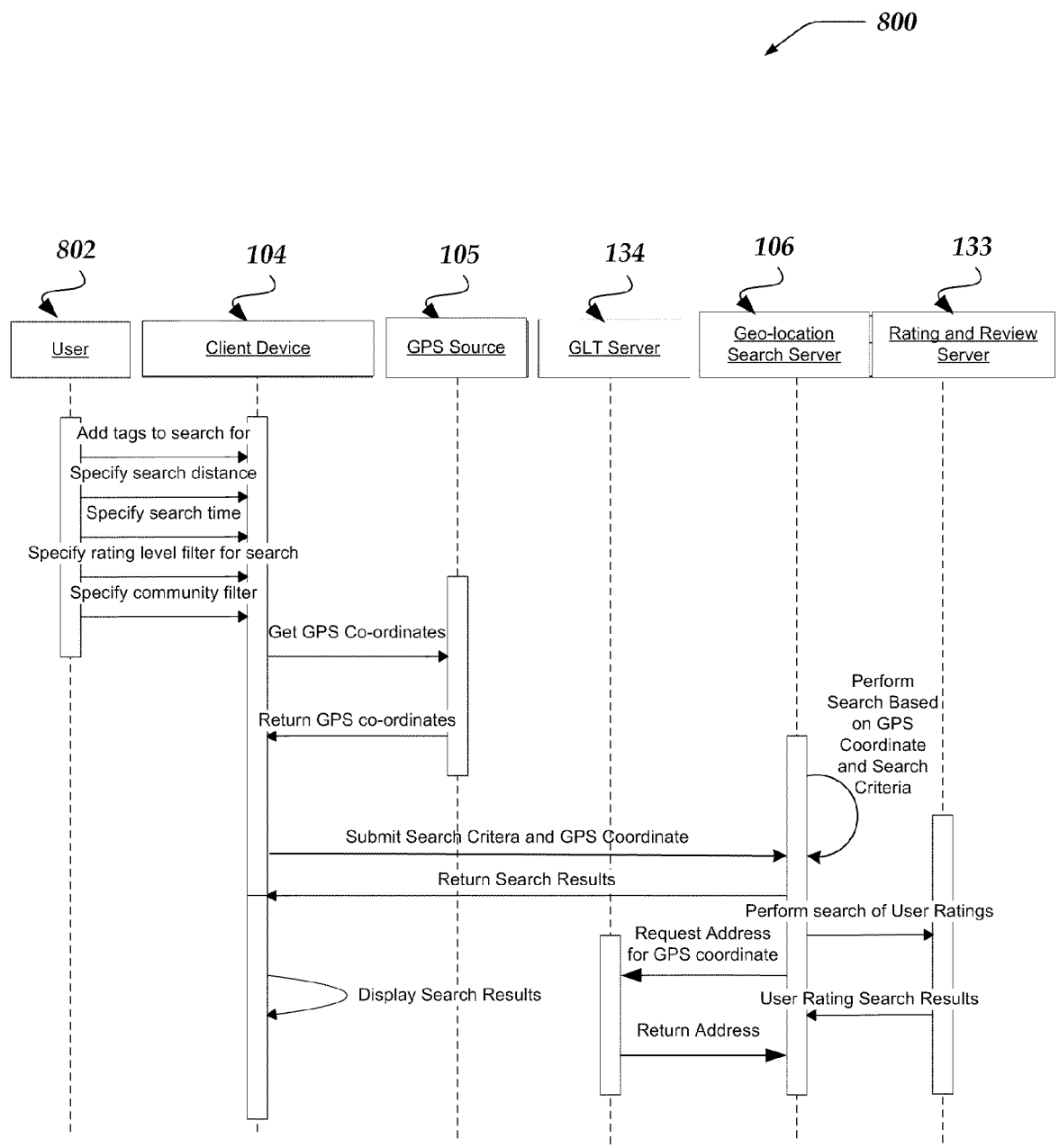
FIG. 8 shows one embodiment of a signal flow for searching the social network for location information.

FIG. 8 shows one embodiment of a signal flow for searching a social network for location description. Signal flow 800 of FIG. 8 embodies a process substantially similar to process 400 of FIG. 4. As shown, user 802, who is a member of a social network, initiates a search of a location which may be associated with a location name, tag, rating, or the like. In one embodiment (not shown), user 802 may be signed/logged in with a user ID. Client 104 may manage the sign-in process, or user 802 may have to enter their user name and password.

User 802 enters several search criteria, including a text to search for (e.g., matched against tags, location names, or any other text field associated with a GPS coordinate), a search distance, a search time, a rating filter, a community filter, or the like. The search distance may represent a distance from the current location of client device 104 (e.g., identified by a GPS coordinate(s) received from GPS source 105). A search time may default to a current local time if one is not entered. A community filter may default to user 802's community.

As shown, client device 104 retrieves a GPS coordinate(s) from GPS source 104. In another embodiment, the client device 104 may include a GPS receiver configured to retrieve the GPS coordinate(s) without communicating with GPS source 105. Client device 104 also submits the search criteria and the GPS coordinate(s) to Geo-location Search Server (GSS) 106 for further processing. In response, Client device 104 receives the search result(s) from GSS 106. Client device 104 displays the search result(s) on a display in an HTML enabled browser, in a proprietary display, or the like.

GPS source 105 may be a Bluetooth enabled GPS device configured to communicate one or more GPS coordinates with client device 104. GPS source 105 receives a request for a GPS coordinate(s) and returns the GPS coordinate(s) of where GPS source 105 is located. In one embodiment, GPS source 105 may be configured to return one ore more GPS coordinate(s) (e.g., a longitude, a latitude, a range of longitudes and latitudes near its current geographical location, or the like).

GSS 106 receives the search criteria and performs a search of a social network for a location name based on the GPS coordinate(s) and the search criteria. In one embodiment, if the location name is absent from the social network, a member in the social network associated with the location name is not found, or the search does not otherwise return a search result, GSS 106 may request from GLT Server 134 an address associated with the geographical coordinate, and may provide this address as the location name. The search process is described in more detail in process 400 of FIG. 4. In the embodiment shown, GSS 106 may also search for ratings associated with a location name and/or GPS coordinate(s). In one embodiment GSS 106 may only return search results with ratings that match the rating filter provided in the search criteria. In any case, GSS 106 returns the search results to client device 104.

Rating and review server 133 may receive a request for a rating for a location name and/or GPS coordinate. The request may be a search criteria (e.g., rating filter). Thus, rating and review server 133 may only return ratings that match the search criteria. In another embodiment, rating and review server 133 may return all ratings associated with the location name and/or GPS coordinate.

Figure 9:
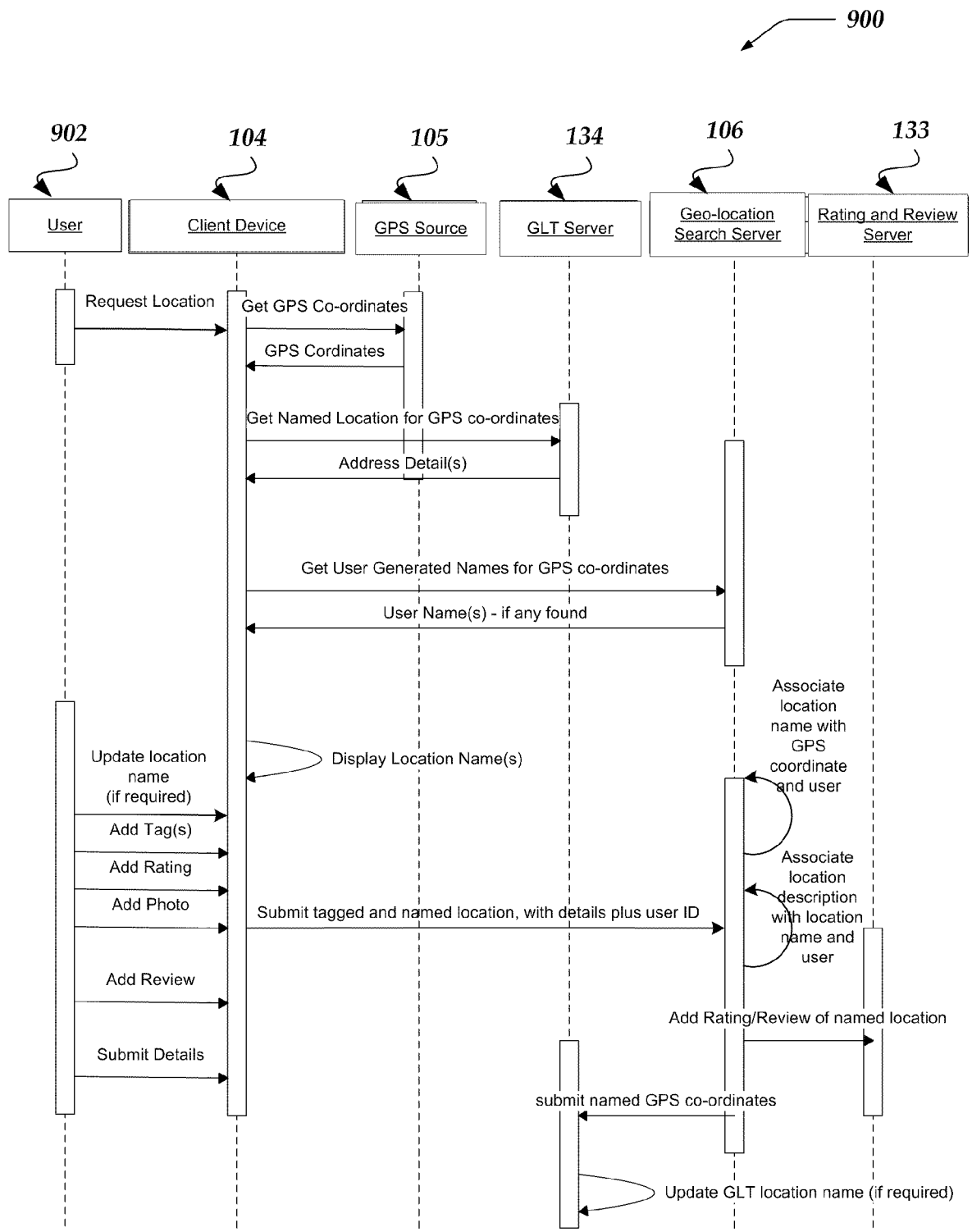
FIG. 9 shows one embodiment of a signal flow for entering/updating location information associated with a member in the social network.

FIG. 9 shows one embodiment of a signal flow for entering/updating location description associated with members in a social network. In one embodiment (not shown), user 802 may be signed in with a user ID. Client 104 may manage the sign-in process, or user 802 may have to enter their user name and password. Signal flow 900 of FIG. 9 embodies a process substantially similar to process 600 of FIG. 6.

As shown, user 902 requests a location, via a search or other form of retrieval request. Client device 104 may respond to the request for the location, by, among other things, getting a GPS coordinate(s) from GPS source 105. The location may be specified as a single GPS coordinate, but may also be specified as a proximity or range of GPS coordinates (e.g., a 2 meter radius from the GPS coordinate). Although, signal flow 900 shows a GPS source 105 providing GPS coordinates to client device 104, signal flow 900 can be modified such that GPS source 105 is optional and unused, and the GPS coordinates may be retrieved directly from client device 104. In one embodiment, user 902 may perform a search of a social network similar to the process shown in signal flow 800 of FIG. 8.

Client device 104 may request GLT server 134, for location names (e.g., named locations) based on the GPS coordinate(s). In one embodiment, GLT server 134 may respond with address details, and/or location names for the GPS coordinate(s). Based on members update, entry, or feedback there could be several location names for a GPS coordinate. In on embodiment, a street address may be provided as the primary location. In another embodiment, location name(s) provided by other members may be provided. Client device 104 may then display the retrieved location information.

In response, user 902 may be enabled by client device 104 to select one of the provided location names (e.g., names or address) for updating. User 902 may update the location name and/or other location description be entering the information into client device 104. The location description includes tags, ratings, photos, reviews, and/or other details about the location name. The location name and/or other location description are sent to GSS 106 for further processing.

GSS 106 may associate or send a request to GLT server 134 to associate the location name with the GPS coordinate and/or with user 902 in the social network. GSS 106 may also associate the location description with the location name and/or user 902 in the social network. GSS 106 may also send rating/review information received form client device 104 to rating and review server 133 for storage and further processing. Moreover, GSS 106 may submit/send the location name and GPS coordinate (e.g., the named GPS coordinate) to GLT server 134 for update/association in the social network or other database or datastore.

Although not shown, the update/association of the location name/location description enables GSS 106 to receive a another request for a plurality of location names to be found in the social network based on the received GPS coordinate. GSS 106 may provide, in response to the other request, at least the location name and the other location name in the plurality of location names, wherein the plurality of location names is ordered based on a comparison of a frequency of an update of the location name with another frequency of another update of the other location name.

Although signal flows 800 and 900, are described as operating on GPS coordinates, in an alternate embodiment, these signal flows can be modified to operate substantially similarly with any geographical coordinates using any of a variety of other mechanisms without departing from the scope of the invention. For example, in signal flows 800 and 900, client device 104 may retrieve a geographical coordinate from GPS source 104, and may send the geographical coordinate to GSS 106 for further processing.

Illustrative User Interfaces

FIG. 10 shows one embodiment of a display for entering/updating location description associated with GPS coordinate 1005 and with a member in a social network. The process for entering/updating location information is described in process 600 of FIG. 6 and/or signal flow 900 of FIG. 9. Display 1000 of FIG. 10 may be shown for example on one of client devices 101-103.

In one embodiment, a member of the social network may use display 1000 of FIG. 10 to enter/update the location description. As shown, label 1020 may specify the name of another member who entered the location description. The other member may be the last member who entered/updated the information, or a member who originally created the location description for the GPS coordinate 1005.

As shown, GPS coordinate 1005 comprises two text entry boxes, pre-populated with GPS coordinates determined by the geographical location of the client device. The member may update GPS coordinate 1005.

Location pull-down list 1002 may display a location name currently associated with the GPS coordinate 1005. Location pull-down list 1002 may be a selection list of possible location names based on a history of location names entered at a location within a proximity to GPS coordinate 1005 and/or at a time within a (close) range to a local time associated with GPS coordinate 1005. In one embodiment, the selection list may be sorted based on the most recent location name entered and/or by a frequency of a particular location name chosen for GPS coordinate 1005. Accordingly, there can possibly be more than one address or location name for a particular location/GPS coordinate. Moreover, location entry 1004 may also enable the member to enter a different location name to be associated with GPS coordinate 1005 in the social network. As shown, the member has entered "Best Restaurant."

Tag entry 1007 enables the member to enter a new tag, including a single tag or a set of tags (e.g., entered as a list of words with spaces in between). Tag list 1010 displays previously entered tags for the location name. In one embodiment, the tags in tag list 1010 may have been previously entered by, for example, member "John Smith," or by any other member of the social network. By pressing button 1008, the member may associate the tag in tag entry 1007 or the tag selected from tag list 1010 if no tag is entered in tag entry 1007 with the location name.

Time 1011-1012 may be entered as hours and minutes, but may be specified as any time measure. Time 1011-1012 may be used by the member to specify a time associated with the GPS coordinate 1005 and a location name. Time 1011-1012 defaults to a current local time for GPS coordinate 1005.

Add media button 1020 may enable the member to associate a photo, sound bite or video footage, or other media with the location name (e.g., from location pull down list 1002 or from location entry 1004). In one embodiment, the media may be stored as a tag, or other location description.

Add rating and review button 1014 may enable the member to access another display that allows the member to associate a rating and review with the location name. A rating may be any numeric value, star rating, or other qualitative value.

Submit location button 1016 enables the member to submit the location name, or any of the location description from display 1000 for updating/entering in the social network.

Send comment button 1022 enables the member to send a comment via another display to another member associated with the location name. For example, the member may send a comment to the other member "John Smith" over a variety of modes of communications, including SMS, IM, email, telephone, or the like.

Add to community button 1024 enables the member to add the other member to the member's community/social network. In one embodiment, a link may be created between the member and the other member in the social network.

FIG. 11 shows one embodiment of a display for searching a social network for location information. Display 1100 of FIG. 11 may be shown for example on one of client devices 101-103. In one embodiment, a member of the social network may use display 1100.

The search may be based in part on GPS coordinate 1107. As shown, GPS coordinate 1107 comprises two text entry box, pre-populated with GPS coordinates determined by the location of the client device. The member may update the GPS coordinate 1107.

The search may also be based on other search criteria, including a search string determined by search drop down list 1102 and/or query box 1104, proximity list 1106, time 1109-1110, and/or rating drop list 1112.

Search drop down list 1102 and/or query box 1104 enable the member to specify a search string to be matched against location names, tags, or other location description associated with members in the social network.

Time 1109-1110 may be entered as hours and minutes, but may be specified as any time measure. Time 1109-1110 may be used by the member to specify a time associated with the GPS coordinate and location name. Time 1011-1012 defaults to a current local time for the GPS coordinate 1107.

Proximity list 1106 enables the user to specify a proximity to search within—e.g. a distance from GPS coordinate 1107.

Submit button 1116 sends GPS coordinate 1107 and/or the search criteria specified on display 1100 to a server, for further searching of the social network. Process 400 of FIG. 4 and/or signal flow 800 of FIG. 8 may be used, for example, to search the social network.

Advanced search button 1114, when pressed, provides an advance search display (not shown) which enables the member to retrieve search results that are determined by other search criteria, including whether the searched location information is associated with a review, or a photo, or other form of media. In one embodiment, the advance search display enables the member to add a filter to only return locations that have been added within the past 'X' days.

FIG. 12 shows one embodiment of a display for providing search results of a search for location information from a social network. A user of display 1200 may be a member of a social network.

As shown, the search results for a search of "Restaurants within 500 meters", specified by label 1202, are shown in display 1200 of FIG. 12. In one embodiment, display 1200 may show search results based on search criteria provided from display 1100 of FIG. 11. In another embodiment, display 1200 may be pushed to the client device based on a variety of conditions—including a time period, a physical proximity to a location (e.g., a sponsor's location), or the like. In any case, display 1200 includes the map of the searched area. Each of the points 1204-208 corresponds to different one of the returned search results and represents a different location. Some or all of the search results may be displayed.

The search results may be ordered, such that some points are more relevant to the user of display 1200/member, then other points. For example, point 1204 is larger (e.g., more relevant) than point 1208, and point 1207 is larger than point 1207. Location names may also be shown with the points (e.g., "Best restaurant" for point 1207). Moreover, a location description, such as a tag may also be shown (e.g., "drinks after work"). A location name/point determined to be a sponsored advertisement may be highlighted as such. For example, point 1205 may be displayed in a different color, and the term "Sponsor:" may be added to its location name. In general, any indication may be used to indicate the source of sponsorship, or that the point is a sponsored point. In one embodiment, the member may have opted-in or opted-out of receiving marketing messages (e.g., point 1205).

As shown, display 1200 also includes zoom bar 1230 configured to enable the user to zoom in on a specified are of the map. Chat button 1220 may enable the member to communicate with at least one other member associated with at least one of the points shown and who are within an immediate proximity.

Although not shown, if the member selects a point, a display which includes the details of the search result may be shown. The display may include the name of another member who entered the search result, a rating, a location name, one or more tags, or the like. The member may further select a more detailed display associated with the point. The detailed display may be similar to display 1000 of FIG. 10. The detailed view may include full details of the location, e.g., access to photo and media as well as listing of all tags, and access to review(s) if any are present. From this display, the member may select to add the other member who posted the location, to the member's community, or send a comment to the other member about the location, as described in conjunction with FIG. 10. Also the user can leave comments about the location on the location entry. In an alternate embodiment, selecting the point may directly show display 1000.

FIG. 13 shows another embodiment of a display for providing search results of a search of a social network for location description. As shown, display 1300 of FIG. 13 is substantially similar to display 1200 of FIG. 12. The difference between the displays is that display 1300 shows route 1340 between two points, point 1204 (labeled "A") and point 1208 (labeled "B"). Moreover, label 1302 displays information identifying the route. All other components are similar to corresponding components of display 1200.

Illustrative Data Models

Figure 16:
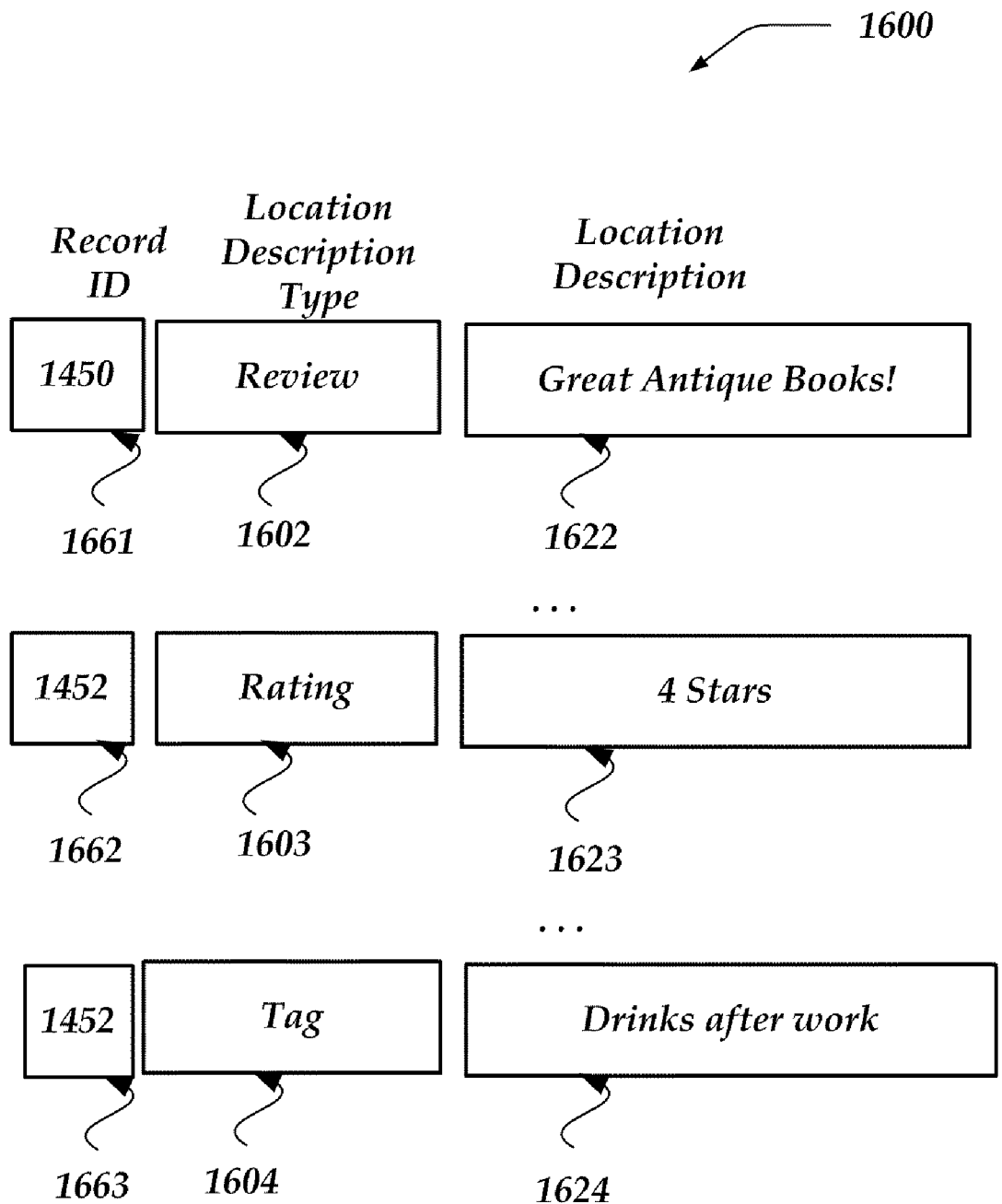
FIG. 16 shows an example of a relational data model of location descriptions associated with location names, in accordance with the present invention.

FIG. 14-16 shows examples of data models used in at least some embodiments of the invention. FIG. 14 shows an example of a social network with a detailed view of location description associated with a member of the social network. Social network 1400 may include many more or less objects than those shown in FIG. 14. However, the objects shown are sufficient to disclose an illustrative embodiment for practicing the present invention.

As shown, social network 1400 may be a graph, but may be any other structure configured to store network information, including a tree, a database, a linked list, or the like.

Social network 1400 includes members 1401-1405. Members 1401-1405 maybe related to each other by one or more degrees of separation. For example, member 1401 is related to members 1402-1403 by one degree of separation. Member 1401 is related to member 1404 by two degrees of separation, and to member 1405 by three degrees of separation.

Community of member 1401 is shown as a boundary around members 1401-1403. Community of member 1401 may be determined by any mechanism for grouping members, including a maximum degree of separation between member 1401 and other members of the community, a maximum number of other members closely related to member 1401, a particular strength of association between member 1401 and the other members, or the like.

A detailed view of other objects related to member 1401 is also shown. The other objects may have been provided by member 1401, provided by other members of social network 1400, or even entered as a default setting, by for example, a system administrator, or the like. Process 600 of FIG. 6 and/or signal flow 900 of FIG. 9 may be used to provide the other objects, for example. The detailed view includes GPS coordinate 1440, location names 1450-1451, and location description 1470-1472.

Location name 1450 is associated with GPS coordinate 1440 and with member 1401 by a relevancy score of 0.5. Location name 1451 is associated with GPS coordinate 1440 and with member 1401 by a relevancy score of 0.8. Accordingly, location name 1451 is more closely related to GPS coordinate 1440 and with member 1401 than location name 1450.

Location descriptions 1470-1472 are associated with location name 1451. While location description 1470 is shown as a rating, location description 1471 is shown as a time, and location description 1472 is shown as a tag, location descriptions 1470-1472 may include any type of location description, including a comment, a review, multimedia, or the like.

GPS coordinate 1441, location name 1452, and location description 1472 are examples of information associated with all members of a community. GPS coordinate 1441 is associated with community for member 1401. GPS coordinate 1441 is associated with location name 1452. Location name 1452 is associated with location description 1472. In one embodiment, GPS coordinate 1441, location name 1452, and location description 1472 may be provided by an administrator, pre-loaded, or the like. In another embodiment, this information may be changed from information associated to a particular member to information associated with a community.

FIG. 15 shows an example of a relational data model of location records. Table 1500 of FIG. 15 shows another view of a social network of members associated with location description. Table 1500 may for example include information from social network 1400 of FIG. 14. Process 600 of FIG. 6 and/or signal flow 900 of FIG. 9 may be used to enter/update the rows of table 1500, for example.

As shown, table 1500 includes records with fields for a record ID, GPS coordinate, member ID, location name, community, relevancy score, and time. These fields are shown as example, and other fields may be included, or some fields may be omitted without departing from the scope of the invention.

Record IDs 1561-1564 are unique IDs for identifying the rows. Values for Record IDs 1561-1564 may be unique, but may be assigned arbitrarily. GPS coordinates 1502-1509 include any type of GPS coordinates. As shown, GPS coordinates 1502-1509 are shown as being stored in a GPS coordinate X and GPS coordinate Y fields. The GPS coordinate X and GPS coordinate Y fields may, for example, represent longitude and latitude values, respectively. In another embodiment, the GPS coordinate X and GPS coordinate Y values may be stored in the same field. Member IDs 1512-1515 may be any identifier for members of a social network, including numeric identifiers. Location names 1522-1525 are shown as string values, but may be any type of media, including photos, video, or the like. Communities 1532-1535 are lists of members. Relevancy scores 1542-1545 may be any numeric or quantitative value configured to be used in ordering or ranking the location information of table 1500. Times 1552-1555 may be any time measure.

As shown, at least some records of table 1500 may include no values for some fields. These fields may match any value. For example, time 1552 may match any time. Similarly, the row identified by record ID 1452 may have no value for its member ID, and thus may represent a location record for a community.

Moreover, some rows may represent default location names for a GPS coordinate (e.g., a street address). For example, the row identified by record ID 1565 includes no values for member ID 1515, community 1535, relevancy score 1545, and time 1555. Thus, this row may include default data for GPS coordinates 1508-1509.

FIG. 16 shows an example relational data model of location descriptions associated with location names. Process 600 of FIG. 6 and/or signal flow 900 of FIG. 9 may be used to provide the rows of table 1600, for example. As shown, table 1600 includes rows with several fields, including a record ID, a location description type, and a location description. Record IDs 1661-1663 may be any arbitrary value representing a particular location name entered/updated by a member. Record IDs 1661-1663 may correspond to the record IDs from table 1500 of FIG. 1500. In other words, record IDs 1661-1663 may be a foreign key related to rows of table 1500.

Location description types 1602-1604 may include any type for location descriptions, including a tag, a comment, a rating, a review, a time, or the like. Location descriptions 1622-1624 include the values for the location descriptions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method for providing location description over a network, wherein the method is performed by a network device that enables actions comprising:
   in response to a request for information regarding a geographic coordinate from a first member of a social network, providing a location name to the first member, wherein the location name is associated by a second member of the social network with the geographic coordinate;
   receiving another location name that is provided by the first member for association with the geographic coordinate;
   in response to another request for location information associated with the geographic coordinate, providing at least the location name and the other location name and a relevancy score, and wherein the relevancy score represents at least a frequency of an identification of the geographic coordinate by at least the other location name by at least one member of the social network; and
   in response to the other request for the location information, providing the location name and at least the other location name based on at least the relevancy score and a degree of separation between the first member and the second member of the social network.

2. The method of claim 1, wherein the request for location information is further associated with search criteria that includes a query string, a search distance, a search time, a rating level, a community filter for the social network, or a time of last update of the location name or of the location description.

3. The method of claim 1, further comprising:
   receiving a location description from the second member; and
   associating the location description with the location name and with the second member to enable each member of the social network to search based on the location description.

4. The method of claim 3, wherein the location description comprises at least one of a tag, a comment, a remark, a rating, a time, a word, a set of words, or a multimedia content.

5. The method of claim 1, wherein the actions further comprise providing the first member with a list of possible location names based on a history of location names entered at a location within a proximity to the geographic coordinate and at a time within a range of a local time.

6. The method of claim 1, wherein the relevancy score further represents a closeness that is based on both an association between the geographical coordinate and the other location name and the frequency of the identification of the geographical coordinate.

7. A network device for providing location description over a network, wherein the network device enables actions comprising:
   in response to a request for information regarding a geographic coordinate from a first member of a social network, providing a location name to the first member, wherein the location name is associated by a second member of the social network with the geographic coordinate;
   receiving another location name that is provided by the first member for association with the geographic coordinate;
   in response to another request for location information associated with the geographic coordinate, providing at least the location name and the other location name and a relevancy score, and wherein the relevancy score represents at least a frequency of an identification of the geographic coordinate by at least the other location name by at least one member of the social network; and
   in response to the other request for the location information, providing the location name and at least the other location name based on at least the relevancy score and a degree of separation between the first member and the second member of the social network.

8. The network device of claim 7, wherein the request for location information is further associated with search criteria that includes a query string, a search distance, a search time, a rating level, a community filter for the social network, or a time of last update of the location name or of the location description.

9. The network device of claim 7, wherein the actions further comprise:
receiving a location description from the second member; and
associating the location description with the location name and with the second member to enable another searching of the social network based on the location description.

10. The network device of claim 9, wherein the location description comprises at least one of a tag, a comment, a remark, a rating, a time, a word, a set of words, or a multimedia content.

11. The network device of claim 7, wherein the actions further comprise enabling each member to search the social network for the other location name based in part on at least the degree of separation between the first member and the second member.

12. The network device of claim 7, wherein the actions further comprise providing the first member with a list of possible location names based on a history of location names entered at a location within a proximity to the geographic coordinate and at a time within a range of a local time.

13. The network device of claim 7, wherein the relevancy score further represents a closeness that is based on both an association between the geographical coordinate and the other location name and the frequency of the identification of the geographical coordinate.

14. An article of manufacture including a non-transitory processor readable storage medium having instructions for providing location description over a network, wherein a processor executing the instructions enables actions, comprising:
in response to a request for information regarding a geographic coordinate from a first member of a social network, providing a location name to the first member, wherein the location name is associated by a second member of the social network with the geographic coordinate;
receiving another location name that is provided by the first member for association with the geographic coordinate;
in response to another request for location information associated with the geographic coordinate, providing at least the location name and the other location name and a relevancy score, and wherein the relevancy score represents at least a frequency of an identification of the geographic coordinate by at least the other location name by at least one member of the social network; and
in response to the other request for the location information, providing the location name and at least the other location name based on at least the relevancy score and a degree of separation between the first member and the second member of the social network.

15. The article of manufacture of claim 14, wherein the actions further comprise:
receiving a location description from the second member; and
associating the location description with the location name and with the second member to enable each member to search the social network based on the location description.

16. The article of manufacture of claim 14, wherein the actions further comprise providing the first member with a list of possible location names based on a history of location names entered at a location within a proximity to the geographic coordinate and at a time within a range of a local time.

17. The article of manufacture of claim 14, wherein the relevancy score further represents a closeness that is based on both an association between the geographical coordinate and the other location name and the frequency of the identification of the geographical coordinate.

18. A system for providing location description over a network, comprising:
a server device, including:
a memory for storing instructions and data; and
a processor, wherein the execution of the instructions by the processor enables actions, comprising:
in response to receiving a request for information regarding a geographic coordinate from a client device associated with a first member of a social network, providing a location name to the first member, wherein the location name is associated by a second member of the social network with the geographic coordinate;
receiving another location name from the client device that is provided by the first member for association with the geographic coordinate;
in response to receiving from another client device another request for location information associated with the geographic coordinate, providing at least the location name and the other location name and a relevancy score to the at least another client device, and wherein the relevancy score represents at least a frequency of an identification of the geographic coordinate by at least the other location name by at least one member of the social network; and
in response to receiving from the other client device the other request for the location information, providing the location name and at least the other location name based on at least the relevancy score and a degree of separation between the first member and the second member of the social network.

19. The system of claim 18, wherein the actions further comprise:
receiving a location description from the second member; and
associating the location description with the location name and with the second member to enable each member to search the social, network based on the location description.

20. The system of claim 18, wherein the actions further comprise providing the first member with a list of possible location names based on a history of location names entered at a location within a proximity to the geographic coordinate and at a time within a range of a local time.

* * * * *

UNITED STATES PATENT AND TRADEMARK OFFICE
CERTIFICATE OF CORRECTION

| | | |
|---|---|---|
| PATENT NO. | : 8,260,315 B2 | Page 1 of 1 |
| APPLICATION NO. | : 13/042251 | |
| DATED | : September 4, 2012 | |
| INVENTOR(S) | : Murray Blake Fortescue et al. | |

It is certified that error appears in the above-identified patent and that said Letters Patent is hereby corrected as shown below:

On the Title page, in fields (12) and (75), in "Inventors" in column 1, line 1, delete "Fortescu," and insert -- Fortescue, --, therefor.

In column 36, line 53, in Claim 19, delete "social," and insert -- social --, therefor.

Signed and Sealed this
Sixth Day of November, 2012

David J. Kappos
*Director of the United States Patent and Trademark Office*